US009076218B2

(12) United States Patent
Tsai et al.

(10) Patent No.: US 9,076,218 B2
(45) Date of Patent: Jul. 7, 2015

(54) METHOD AND IMAGE PROCESSING DEVICE FOR IMAGE DYNAMIC RANGE COMPRESSION WITH LOCAL CONTRAST ENHANCEMENT

(71) Applicants: Chi-Yi Tsai, New Taipei (TW); Chih-Hung Huang, New Taipei (TW)

(72) Inventors: Chi-Yi Tsai, New Taipei (TW); Chih-Hung Huang, New Taipei (TW)

(73) Assignee: TAMKANG UNIVERSITY, New Taipei (TW)

( * ) Notice: Subject to any disclaimer, the term of this patent is extended or adjusted under 35 U.S.C. 154(b) by 114 days.

(21) Appl. No.: 13/909,086

(22) Filed: Jun. 4, 2013

(65) Prior Publication Data
US 2014/0254928 A1    Sep. 11, 2014

(30) Foreign Application Priority Data

Mar. 5, 2013    (TW) .............................. 102107728 A

(51) Int. Cl.
G06K 9/00    (2006.01)
G06T 5/00    (2006.01)
H04N 19/117  (2014.01)
H04N 19/136  (2014.01)
(Continued)

(52) U.S. Cl.
CPC .............. G06T 5/008 (2013.01); H04N 19/117 (2014.11); H04N 19/136 (2014.11); H04N 19/182 (2014.11); G06T 5/40 (2013.01)

(58) Field of Classification Search
CPC ............ G06K 9/00456; H04N 1/4072; H04N 1/4074; H04N 5/262; H04N 5/35581; H04N 5/57; H04N 9/045; H04N 21/4318; H04N 21/44008; G06T 5/00; G06T 5/002; G06T 5/004; G06T 5/007; G06T 5/008; G06T 5/009; G06T 5/20; G06T 5/40; G06T 5/50; G06T 7/0085; G06T 2207/10012; G06T 2207/10016; G06T 2207/10024; G06T 2207/20008; G06T 2207/20016; G06T 2207/20021; G06T 2207/20028
See application file for complete search history.

(56) References Cited

U.S. PATENT DOCUMENTS 7,426,312 B2 *    9/2008    Dance et al. ................... 382/254
7,783,126 B2 *    8/2010    Yamashita et al. ............. 382/274
(Continued)

OTHER PUBLICATIONS
Jobson et al., "A Multiscale Retinex for Bridging the Gap Between Color Images and the Human Observation of Scenes", IEEE Transactions on Image Processing, Jul. 1997, vol. 6, No. 7, p. 965-p. 976.
(Continued)

Primary Examiner — Jose Couso
(74) Attorney, Agent, or Firm — Jianq Chyun IP Office

(57) ABSTRACT

An image dynamic range compression with local contrast enhancement method for an image processing device is provided. The method includes the following steps. A plurality of input pixels of an image including a first input pixel are received, and an input luminance pixel value of each of the input pixels as well as a darkness intensity level of the image are obtained. A filter result of the first input pixel is obtained according to filter computation on the input luminance pixel values; an image-related parameter is obtained according to image-related computation on the darkness intensity level. The image-related parameter, the filter result of the first input pixel, and the input luminance pixel value of the first input pixel are transformed into an output luminance pixel value of the first input pixel according to a non-linear intensity transfer function and a dynamic range compression with local contrast enhancement algorithm.

20 Claims, 5 Drawing Sheets

(51) Int. Cl.
    H04N 19/182    (2014.01)
    G06T 5/40      (2006.01)

(56) References Cited

U.S. PATENT DOCUMENTS

| | | | | |
|---|---|---|---|---|
| 7,853,095 B2* | 12/2010 | Inada et al. | ............ | 382/260 |
| 7,933,454 B2* | 4/2011 | Bressan et al. | ............ | 382/224 |
| 8,014,034 B2* | 9/2011 | Hooper | ............ | 358/3.27 |
| 8,150,202 B2* | 4/2012 | Mohanty et al. | ............ | 382/274 |
| 8,264,576 B2* | 9/2012 | Susanu et al. | ............ | 348/272 |
| 8,724,196 B2* | 5/2014 | Kobayashi | ............ | 358/522 |

OTHER PUBLICATIONS

Fattal et al., "Gradient Domain High Dynamic Range Compression", ACM Transactions on Graphics, Jul. 2002, vol. 21, No. 3, p. 249-p. 256.
Reinhard et al., "Photographic tone reproduction for digital images", Proc. SIGGRAPH2002, Jan. 2002, p. 267-p. 277.
Monobe et al., "Dynamic range compression preserving local image contrast for digital video camera", IEEE Trans. on Consumer Electronics, Nov. 2004, vol. 51, No. 1, p. 1-p. 10.
Bertalmío et al., "Perceptual color correction through variational techniques",IEEE Transactions on Image Processing, Apr. 2007, vol. 16, No. 4, p. 1058-p. 1072.
Chen et al., "Natural enhancement of color image", EURASIP Journal on Image and Video Processing, 2010, vol. Jul. 2010, Article ID 175203, p. 1-p. 20.
Choudhury et al., "Perceptually motivated automatic color contrast enhancement based on color constancy estimation",EURASIP Journal on Image and Video Processing, Oct. 2010, vol. 2010, Article ID 837237, p. 1-p. 23.
Tsai et al., "A novel simultaneous dynamic range compression and local contrast enhancement algorithm for digital video cameras",EURASIP Journal on Image and Video Processing, Sep. 2011, vol. 2011:6, p. 1-p. 19.
Tsai et al., "A Fast Dynamic Range Compression With Local Contrast Preservation Algorithm and Its Application to Real-Time Video Enhancement",IEEE Transactions on Multimedia, Aug. 2012, vol. 14, No. 4, p. 1140-p. 1152.
Tsai et al., "An adaptive dynamic range compression with local contrast enhancement algorithm for real-time color image enhancement", J Real-Time Image Proc, Nov. 2012, Special Issue, p. 1-p. 18.
Chi-Yi Tsai, "Dynamic Range Compression Method for Image and Image Processing Device", U.S. Appl. No. 13/615,635, filed Sep. 14, 2012, pp. 1-36.
Kim, "Presentation of 'Color Conversion Technology of Four-Primary Color Images Developed on Wide color Gamut R,G,B Monitor'", Nov. 14, 2009, available at: http://cilab.knu.ac.kr/seminar/Seminar/2009/20091121%20Color%20Conversion%20Technology%20of%20Four-Primary%20Color%20Images%20Developed%20on%20Wide%20color%20Gamut%20R,G,B%20Monitor.pdf.
Vytla et al., "A real-time implementation of gradient domain high dynamic range compression using a local Poisson solver", J Real-time Image Proc, Apr. 2011, vol. 8, p. 153-p. 167.
Garnett et al., "A Universal Noise Removal Algorithm With an Impulse Detector", IEEE Transactions on Image Processing, Nov. 2005, vol. 14, p. 1747-p. 1754
Tao et al., "An Integrated Neighborhood Dependent Approach for Nonlinear Enhancement of Color Images", International Conference on Information Technology: Coding and Computing 2004, Apr. 2004, vol. 2, p. 138-139.
Xiao et al., "Adaptive Interpolation Algorithm for Real-time Image Resizing", Proceedings of the First International Conference on Innovation Computing, Information and Control, Sep. 2006, p. 221-p. 224.
Saponara et al., "Algorithmic and architectural design for real-time and power-efficient Retinex image/video processing", J Real-Time Image Proc, May 2007, vol. 1, p. 267-p. 283.
Ferradans et al., "An Analysis of Visual Adaptation and Contrast Perception for Tone Mapping", IEEE Transactions on Pattern Analysis and Machine Intelligence, Oct. 2011, vol. 33, p. 2002-p. 2012.
Hossain et al., "An Approach to Color Image Enhancement Using Minimum Mean Brightness Error Dynamic Histogram Equalization", International Journal of Innovative Computing, Information and Control, Feb. 2011, vol. 7, p. 827.
Hassan et al., "An FPGA-based architecture for a local tone-mapping operator", J Real-Time Image Proc, Nov. 2007, vol. 2, p. 293-p. 308.
Tao et al., "An Illuminance-Reflectance Model for Nonlinear Enhancement of Color Images", Proceedings of the 2005 IEEE Computer Society Conference on Computer Vision and Pattern Recognition, Jun. 2005, p. 1-p. 8.
Saponara et al., "Application-Specific Instruction-Set Processor for Retinex-Like Image and Video Processing", IEEE Transactions on Circuits and Systems—II: Express Briefs, Jul. 2007, vol. 54, p. 596-p. 600.
Tomasi et al., "Bilateral Filtering for Gray and Color Images", Proceedings of the 1998 IEEE International Conference on Computer Vision, Jan. 1998, p. 839-p. 846.
Kerr, "Chrominance Subsampling in Digital Images", Jan. 2012, available at: http://dougkerr.net/pumpkin/articles/Subsampling.pdf.
Hassan et al., "Exploiting Redundancy to Solve the Poisson Equation Using Local Information", 16th IEEE International Conference on Image Processing, Nov. 2009, p. 2689-p. 2692.
Tsai et al., "Heterogeneity-Projection Hard-Decision Color Interpolation Using Spectral-Spatial Correlation", IEEE Transactions on Image Processing, Jan. 2007, vol. 16, p. 78-p. 91.
Reinhard et al., "Image Display Algorithms for High and Low Dynamic Range Display Devices", Journal of the Society for Information Display, Dec. 2007, vol. 15, p. 997-p. 1014.
Marsi et al., "Integrated video motion estimator with Retinex-like pre-processing for robust motion analysis in automotive scenarios: algorithmic and real-time architecture design", J Real-Time Image Proc, Feb. 2010, vol. 5, p. 275-p. 289.
Kim et al., "Natural HDR Image Tone Mapping Based on Retinex", IEEE Transactions on Consumer Electronics, Dec. 2011, vol. 57, p. 1807-p. 1814.
Buades et al., "Nonlocal image and movie denoising", International Journal of Computer Vision, Jan. 2010, vol. 76, p. 123-p. 139.
"Radiance", Oct. 2011, available at: http://radsite.lbl.gov/radiance/.
Land et al., "Recent Advances in Retinex Theory", Vision Res., Mar. 2003, vol. 26, p. 7-p. 21.
Marsi et al., "Video Enhancement and Dynamic Range Control of HDR Sequences for Automotive Applications", EURASIP Journal on Advances in Signal Processing, May 2007, vol. 2007, p. 1-p. 9.

* cited by examiner

METHOD AND IMAGE PROCESSING DEVICE FOR IMAGE DYNAMIC RANGE COMPRESSION WITH LOCAL CONTRAST ENHANCEMENT

CROSS-REFERENCE TO RELATED APPLICATION

This application claims the priority benefit of Taiwan application serial no. 102107728, filed on Mar. 5, 2013. The entirety of the above-mentioned patent application is hereby incorporated by reference herein and made a part of this specification.

BACKGROUND OF THE INVENTION

1. Field of the Invention

The present invention generally relates to a method and an image processing device. In particular, the present invention relates to a method and an image processing device for image dynamic range compression with local contrast enhancement.

2. Description of Related Art

A pixel is a basic unit of composition of an image, and each image includes a plurality of different colors of pixels. The term "dynamic range" is defined as the ratio of the highest to the lowest detectable pixel value of an image. A so-called high dynamic range scene refers to as a scene with a high variation between the extreme of lightness and darkness such as sunrises, sunsets, fireworks, and so forth.

The human senses of sight have a very high dynamic range. A sight adaptation enables the human eye to easily adapt to changes in light levels and distinguish between a higher range of variation. The dynamic range of the human eye is higher than a conventional image capturing device. In terms of photo shooting, when the ambient light is not evenly distributed, the captured image may result in overexposure in bright areas and underexposure in dark areas due to an insufficient dynamic range of the camera. Therefore, when the dynamic range of the image is higher, the image reveals more detail and information of the original scene. In other words, the image is much closer to the original scene in human visions.

A scene with a high dynamic range may be reproduced on displays by color reproduction and dynamic range compression. The dynamic range compression may reduce the dynamic range of an image on the premise of preserving detail and information in bright and dark regions. In related algorithms, an area with high contrast may be first detected from the image, and the dynamic range thereof may be compressed so as to reduce the dynamic range of the whole image. Accordingly, detail of dark regions of the image may be enhanced while detail of bright regions may be preserved. The Adaptive and Integrated Neighborhood-dependent Approach for Non-linear Enhancement (AINDANE) algorithm is a well-known method in color image enhancement and involves two separate processes: adaptive luminance enhancement and adaptive contrast enhancement, wherein the former process compresses dynamic range of an input image, and the latter process restores local contrast after range compression. However, the AINDANE algorithm only processes the luminance component of the input image; that is, it requires combining with a linear color restoration process to deal with color image enhancement. Although this algorithm performs well in color image enhancement, the image enhancement procedure usually requires high computational costs with a large memory, leading to an inefficient algorithm. Besides, the AINDANE algorithm may lead to a large color mapping ratio for a dark pixel and thus over-enhance dark regions of the image.

Accordingly, an adaptive dynamic range compression format with a local contrast enhancement algorithm is proposed in the present invention so as to improve visual quality of color images and further achieve real-time performance in processing high-definition video streams in limited computation costs.

SUMMARY OF THE INVENTION

Accordingly, the present invention is directed to a method and an image processing device for dynamic range compression with local contrast enhancement so as to enhance image quality.

The present invention is directed to a method for image dynamic range compression with local contrast enhancement. The method includes the following steps. First, a plurality of input pixels of an image are received, wherein the input pixels include first input pixel. An input luminance pixel value of each of the input pixels and a darkness intensity level of the image are obtained. Next, filter computation is performed based on the input luminance pixel values of the input pixels so as to obtain a filter result of the first input pixel, and image-related computation is further performed based on the darkness intensity level of the image so as to obtain an image-related parameter. Then, the input luminance pixel value of the first input pixel, the image-related parameter, a first parameter, and a second parameter are transformed into a luminance remapping output value of the first input pixel according to a non-linear intensity-transfer function, wherein the second parameter is a dependent variable of the first parameter. When the input luminance pixel value of the first input pixel is equal to 0, the luminance remapping output value is 0. Moreover, an output luminance pixel value of the first input pixel is obtained according to a dynamic range compression with local contrast enhancement algorithm based on a ratio of the input luminance pixel value of the first input pixel to the filter result of the first input pixel, the luminance remapping output value of the first input pixel, and a local contrast enhancement component of the first input pixel, wherein the local contrast enhancement component is a multiplication of the input luminance pixel value of the first input pixel and a derivative function of the non-linear intensity-transfer function of the first input pixel.

According to an exemplary embodiment of the present invention, the formula to obtain the image-related parameter by performing the image-related computation based on the darkness intensity level of the image may be represented as Eq.(1):

$$z = \begin{cases} 0 & \text{for } L \leq L_{min} \\ \dfrac{L - L_{min}}{L_{max} - L_{min}} & \text{for } L_{min} \leq L \leq L_{max}, \\ 1 & \text{for } L > L_{max} \end{cases} \quad \text{Eq. (1)}$$

wherein L is the darkness intensity level of the image and z is the image-related parameter. $L_{min}$ and $L_{max}$ are positive integers and satisfy $0 < L_{min} < L_{max} < L_{in}^{max}$, and $L_{in}^{max}$ is the maximum of the input luminance pixel values.

According to an exemplary embodiment of the present invention, the non-linear intensity-transfer function for transforming the input luminance pixel value of the first input pixel, the image-related parameter, the first parameter, and the second parameter into the luminance remapping output value of the first input pixel is represented as Eq.(2):

$$T_2[L_{in}(x, y)] = \frac{1}{2}\left\{\begin{array}{l}L_{in}^{[(1-\varphi)z+\varphi]}(x, y) + L_{in}^{(2-z)}(x, y) + \\ S(1-z)L_{in}^{(\varphi+1)}(x, y)(1 - L_{in}(x, y))\end{array}\right\}, \quad \text{Eq. (2)}$$

wherein x and y are positive integers, and z is the image-related parameter. $L_{in}(x,y)$ is the input luminance pixel value of the input pixel on the x-th row and the y-th column of the image. S is the first parameter and satisfies $0 < S \le 2$. $\varphi$ is the second parameter and satisfies $0 \le \varphi \le \min(1,S)$ or $0 \le \varphi \le \Phi$, wherein $\Phi$ is the solution of $\varphi(1+\epsilon)^{(\Phi-1)}-S=0$, and $\epsilon$ is a positive value.

According to an exemplary embodiment of the present invention, the step of obtaining the output luminance pixel value of the first input pixel based on the ratio of the input luminance pixel value of the first input pixel to the filter result of the first input pixel, the luminance remapping output value of the first input pixel, and the local contrast enhancement component of the first input pixel according to the dynamic range compression with local contrast enhancement algorithm is included as follows. First, a non-linear intensity-transfer derivative function is obtained according to the non-linear intensity-transfer function, wherein the non-linear intensity-transfer derivative function is a first-order derivative function of the non-linear intensity-transfer function with respect to the input luminance pixel value. Next, the first parameter, the second parameter, the image-related parameter, and the input luminance pixel value of the first input pixel are substituted into the non-linear intensity-transfer derivative function, and a non-linear intensity-transfer derivative function result of the first input pixel is obtained according to an output of the non-linear intensity-transfer derivative function. The local contrast enhancement component of the first input pixel is obtained based on the output luminance pixel value of the first input pixel, the non-linear intensity-transfer derivative function result of the first input pixel, and a third parameter. A weighting coefficient of the first input pixel is obtained according to the input luminance pixel value of the first input pixel and the filter result of the first input pixel. Next, a normalization factor is obtained based on the third parameter, a maximum input luminance pixel value, a maximum weighting coefficient, and a maximum non-linear intensity-transfer derivative function result. The maximum input luminance pixel value is the maximum of the input luminance pixel values; the maximum weighting coefficient corresponds to the weighting coefficient of the maximum input luminance pixel value; the maximum non-linear intensity-transfer derivative function result corresponds to the non-linear intensity-transfer derivative function result of the maximum input luminance pixel value. Moreover, the output luminance pixel value of the first input pixel is obtained based on the luminance remapping output value of the first input pixel, the local contrast enhancement component of the first input pixel, the weighting coefficient of the first input pixel, and the normalization factor according to the dynamic range compression and local contrast enhancement algorithm.

According to an exemplary embodiment of the present invention, the formulas of the dynamic range compression with local contrast enhancement algorithm to obtain the output luminance pixel value of the first input pixel based on the ratio of the input luminance pixel value of the first input pixel to the filter result of the first input pixel, the luminance remapping output value of the first input pixel, and the local contrast enhancement component of the first input pixel are represented as Eq.(3)-Eq(7):

$$L_{out\_T_2}^{SDRCLCE}(x, y) = \left\{[f_n^{T_2}(x,y)]^{-1}\left\{\begin{array}{l}\gamma(x,y)L_{T_2}(x,y) + \\ [1-\gamma(x,y)]L_{lce}^{T_2}(x,y)\end{array}\right\}\right\}_0^1, \quad \text{Eq. (3)}$$

$$f_n^{T_2}(x, y) = \left\{\begin{array}{l}\gamma_{max}(x,y)T_2(L_{in}^{max}) + \\ [1-\gamma_{max}(x,y)][\alpha T_2'(L_{in}^{max})L_{in}^{max}]\end{array}\right\}_\varepsilon^1, \quad \text{Eq. (4)}$$

$$L_{T_2}(x, y) = T_2[L_{in}(x, y)], \quad \text{Eq. (5)}$$

$$L_{lce}^{T_2}(x, y) = \alpha T_2'[L_{in}(x, y)]L_{in}(x, y), \quad \text{Eq. (6)}$$

$$T_2'[L_{in}(x, y)] = \quad \text{Eq. (7)}$$
$$\frac{1}{2}\left\{\begin{array}{l}[(1-\varphi)z+\varphi][L_{in}(x,y)+\varepsilon]^{[(1-\varphi)z+\varphi-1]} + \\ (2-z)L_{in}^{(1-z)}(x,y) + \\ S(1-z)L_{in}^{\varphi}(x,y)[(\varphi+1)(1-L_{in}(x,y))-L_{in}(x,y)]\end{array}\right\},$$

wherein $\alpha$ is the third parameter with the value $-1$ or 1, and $\{x\}_a^b$ is an operator representing that the value of x is bounded to the range $a \le x \le b$. $L_{out\_T_2}^{SDRCLCE}(x,y)$ is the output luminance pixel value of the input pixel on the x-th row and the y-th column of the image. $L_{T_2}(x,y)$ is the luminance remapping output value of the input pixel on the x-th row and the y-th column of the image. $L_{lce}^{T_2}(x,y)$ is the local contrast enhancement component on the x-th row and the y-th column of the image. $f_n^{T_2}(x,y)$ is the normalization factor on the x-th row and the y-th column of the image. $\gamma(x,y)$ is the weighting coefficient of the input pixel on the x-th row and the y-th column of the image and is defined as Eq.(8):

$$\gamma(x, y) = \frac{L_{in}(x,y) + \varepsilon}{\bar{L}_{in}(x,y) + \varepsilon}, \quad \text{Eq. (8)}$$

wherein $\bar{L}_{in}(x,y)$ is the filter result of the input pixel on the x-th row and the y-th column of the image, and $\epsilon$ is the positive value. $L_{in}^{max}$ is the maximum input luminance pixel value, and $\gamma_{max}(x,y)$ is the maximum weighting coefficient corresponding to the maximum input luminance pixel on the x-th row and the y-th column of the image.

According to an exemplary embodiment of the present invention, the method for image dynamic range compression with local contrast enhancement further includes the following step. Eq.(9) is generated according to Eq.(3)-Eq.(8):

$$L_{out\_T_2}^{SDRCLCE} = \left\{[g_4(L_{in}, z)]^{-1}\left\{\begin{array}{l}g_3(L_{in}, \bar{L}_{in})g_1(L_{in}, z) + \\ [1-g_3(L_{in}, \bar{L}_{in})]g_2(L_{in}, z)\end{array}\right\}\right\}_0^1, \quad \text{Eq. (9)}$$

$$\equiv g(L_{in}, \bar{L}_{in}, z)$$

wherein $g_1(L_{in},z)$ is a function for computing the luminance remapping output value of the input pixels of the image; $g_2(L_{in},z)$ is a function for computing the local contrast enhancement component of the input pixels of the image; $g_3(L_{in},\bar{L}_{in})$ is a function for computing the weighting coefficient of the input pixels of the image; $g_4(\bar{L}_{in},z)$ is a function for computing the normalization factor.

According to an exemplary embodiment of the present invention, the method for image dynamic range compression with local contrast enhancement further includes the following step. A three-dimensional luminance lookup table (3D LLUT) is constructed according to Eq.(9) so as to obtain the output luminance pixel value of the first input pixel, wherein input indices of the 3D LLUT are the image-related parameter, the input luminance pixel value of the first input pixel, and the filter result of the first input pixel.

According to an exemplary embodiment of the present invention, the method for image dynamic range compression with local contrast enhancement further includes the following step. A two-dimensional luminance lookup table (2D LLUT) is constructed and updated according to Eq.(9) and the image-related parameter so as to obtain the output luminance pixel value of the first input pixel, wherein input indices of the 2D LLUT are the input luminance pixel value of the first input pixel and the filter result of the first input pixel.

According to an exemplary embodiment of the present invention, the method for image dynamic range compression with local contrast enhancement further includes the following step. Eq.(10) is generated according to Eq.(9):

$$\hat{L}_{out\_T_2}^{SDRCLCE} = \begin{cases} g_i(L_{in}, \overline{L}_{in}), & \text{if } w = 0 \\ (1-w) \times g_i(L_{in}, \overline{L}_{in}) + \\ w \times g_{i+1}(L_{in}, \overline{L}_{in}), & \text{otherwise} \end{cases}, \quad \text{Eq. (10)}$$

wherein $g_i(L_{in},\overline{L}_{in})=g(L_{in},\overline{L}_{in},i/N-1)$. N is a finite integer satisfying N≥2, and i is an integer satisfying 0≤i≤N−1, and w=z(N−1)−i.

According to an exemplary embodiment of the present invention, the method for image dynamic range compression with local contrast enhancement further includes the following step. N two-dimensional luminance lookup tables are constructed according to $g_i(L_{in},\overline{L}_{in})=g(L_{in},\overline{L}_{in},i/N-1)$ so as to obtain the output luminance pixel value of the first input pixel, wherein input indices of the N two-dimensional luminance lookup tables are the input luminance pixel value of the first input pixel and the filter result of the first input pixel. N is the finite integer satisfying N≥2, and i is the integer satisfying 0≤i≤N−1.

The present invention is directed to an image processing device. The image processing device includes a luminance extraction circuit, a filter computation circuit, a parameter computation circuit, and a pixel value adjustment circuit. The luminance extraction circuit is configured to receive a plurality of input pixels of an image, wherein the input pixels include a first input pixel. Additionally, the luminance extraction circuit is configured to obtain an input luminance pixel value of each of the input pixels and a darkness intensity level of the image. The filter computation circuit is coupled to the luminance extraction circuit and configured to perform filter computation based on the input luminance pixel values of the input pixels so as to obtain a filter result of the first input pixel. The parameter computation circuit is coupled to the luminance extraction circuit and configured to perform image-related computation based on the darkness intensity level of the image so as to obtain an image-related parameter. The pixel value adjustment circuit is coupled to the luminance extraction circuit, the filter computation circuit, and the parameter computation circuit. The pixel value adjustment circuit is configured to transform the input luminance pixel value of the first input pixel, the image-related parameter, a first parameter, and a second parameter into a luminance remapping output value of the first input pixel according to a non-linear intensity-transfer function, wherein the second parameter is a dependent variable of the first parameter. When the input luminance pixel value of the first input pixel is equal to 0, the luminance remapping output value is 0. The pixel value adjustment circuit is further configured to obtain an output luminance pixel value of the first input pixel according to a dynamic range compression with local contrast enhancement algorithm based on a ratio of the input luminance pixel value of the first input pixel to the filter result of the first input pixel, the luminance remapping output value of the first input pixel, and a local contrast enhancement component of the first input pixel, wherein the local contrast enhancement component is a multiplication of the input luminance pixel value of the first input pixel and a derivative function of the non-linear intensity-transfer function of the first input pixel.

According to an exemplary embodiment of the present invention, the parameter computation circuit is configured to perform the image-related computation based on the darkness intensity level of the image so as to obtain the image-related parameter according to Eq.(1):

$$z = \begin{cases} 0 & \text{for } L \le L_{min} \\ \dfrac{L-L_{min}}{L_{max}-L_{min}} & \text{for } L_{min} \le L \le L_{max} \\ 1 & \text{for } L > L_{max} \end{cases} \quad \text{Eq. (1)}$$

wherein L is the darkness intensity level of the image, and z is the image-related parameter. $L_{min}$ and $L_{max}$ are positive integers and satisfy $0<L_{min}<L_{max}<L_{in}^{max}$, and $L_{in}^{max}$ is the maximum of the input luminance pixel values.

According to an exemplary embodiment of the present invention, the non-linear intensity-transfer function to transform the input luminance pixel value of the first input pixel, the image-related parameter, the first parameter, and the second parameter into the luminance remapping output value of the first input pixel by the pixel value adjustment circuit is represented as Eq.(2):

$$T_2[L_{in}(x,y)] = \frac{1}{2}\begin{Bmatrix} L_{in}^{[(1-\varphi)z+\varphi]}(x,y) + L_{in}^{(2-z)}(x,y) + \\ S(1-z)L_{in}^{(\varphi+1)}(x,y)(1-L_{in}(x,y)) \end{Bmatrix}, \quad \text{Eq. (2)}$$

wherein x and y are positive integers, and z is the image-related parameter. $L_{in}(x,y)$ is the input luminance pixel value of the input pixel on the x-th row and the y-th column of the image. S is the first parameter and satisfies 0<S≤2. φ is the second parameter and satisfies 0≤φ≤min(1,S) or 0≤φ≤Φ, wherein Φ is a solution of $\phi(1+\epsilon)^{(\Phi-1)}-S=0$, and ε is a positive value.

According to an exemplary embodiment of the present invention, the pixel value adjustment circuit is further configured to obtain a non-linear intensity-transfer derivative function according to the non-linear intensity-transfer function, wherein the non-linear intensity-transfer derivative function is a first-order derivative function of the non-linear intensity-transfer function with respect to the input luminance pixel value. The pixel value adjustment circuit is further configured to substitute the first parameter, the second parameter, the image-related parameter, and the input luminance pixel value of the first input pixel into the non-linear intensity-transfer derivative function as well as obtain a non-linear intensity-transfer derivative function result of the first input pixel according to an output of the non-linear intensity-transfer derivative function. The pixel value adjustment circuit is further configured to obtain the local contrast enhancement component of the first input pixel based on the output luminance pixel value of the first input pixel, the non-linear intensity-transfer derivative function result of the first input pixel, and a third parameter. The pixel value adjustment circuit is further configured to obtain a weighting coefficient of the first input pixel according to the input luminance pixel value of the first input pixel and the filter result of the first input pixel. Moreover, the pixel value adjustment circuit is further configured to obtain a normalization factor based on the third parameter, a maximum input luminance pixel value, a maximum weighting coefficient, and a maximum non-linear intensity-transfer derivative function result. The maximum input luminance pixel value is the maximum of the input luminance pixel values; the maximum weighting coefficient corresponds to the weighting coefficient of the maximum input luminance pixel value; the maximum non-linear intensity-transfer derivative function result corresponds to the non-linear intensity-transfer derivative function result of the maximum input luminance pixel value. The pixel value adjustment circuit is further configured to obtain the output luminance pixel value of the first input pixel based on the luminance remapping output value of the first input pixel, the local contrast enhancement component of the first input pixel, the weighting coefficient of the first input pixel, and the normalization factor according to the dynamic range compression and local contrast enhancement algorithm.

According to an exemplary embodiment of the present invention, the dynamic range compression and local contrast enhancement algorithm to obtain the output luminance pixel value of the first input pixel by the pixel value adjustment circuit is represented as Eq.(3)-Eq.(7):

$$L_{out\_T_2}^{SDRCLCE}(x, y) = \left\{ [f_n^{T_2}(x, y)]^{-1} \left\{ \begin{array}{c} \gamma(x, y)L_{T_2}(x, y) + \\ [1 - \gamma(x, y)]L_{lce}^{T_2}(x, y) \end{array} \right\} \right\}_0^1, \quad \text{Eq. (3)}$$

$$f_n^{T_2}(x, y) = \left\{ \begin{array}{c} \gamma_{max}(x, y)T_2(L_{in}^{max}) + \\ [1 - \gamma_{max}(x, y)][\alpha T_2'(L_{in}^{max})L_{in}^{max}] \end{array} \right\}_\varepsilon^1, \quad \text{Eq. (4)}$$

$$L_{T_2}(x, y) = T_2[L_{in}(x, y)], \quad \text{Eq. (5)}$$

$$L_{lce}^{T_2}(x, y) = \alpha T_2'[L_{in}(x, y)]L_{in}(x, y), \quad \text{Eq. (6)}$$

$$T_2'[L_{in}(x, y)] = \quad \text{Eq. (7)}$$
$$\frac{1}{2} \left\{ \begin{array}{c} [(1 - \varphi)z + \varphi][L_{in}(x, y) + \varepsilon]^{[(1-\varphi)z+\varphi-1]} + \\ (2 - z)L_{in}^{(1-z)}(x, y) + \\ S(1 - z)L_{in}^\varphi(x, y)[(\varphi + 1)(1 - L_{in}(x, y)) - L_{in}(x, y)] \end{array} \right\},$$

wherein $\alpha$ is the third parameter with the value −1 or 1, and $\{x\}_a^b$ is an operator representing that the value of x is bounded to the range $a \le x \le b$. $L_{out\_T_2}^{SDRCLCE}(x,y)$ is the output luminance pixel value of the input pixel on the x-th row and the y-th column of the image. $L_{T_2}(x,y)$ is the luminance remapping output value of the input pixel on the x-th row and the y-th column of the image. $L_{lce}^{T_2}(x,y)$ is the local contrast enhancement component on the x-th row and the y-th column of the image. $f_n^{T_2}(x,y)$ is the normalization factor on the x-th row and the y-th column of the image. $\gamma(x,y)$ is the weighting coefficient of the input pixel on the x-th row and the y-th column of the image and is defined as Eq.(8):

$$\gamma(x, y) = \frac{L_{in}(x, y) + \varepsilon}{\overline{L}_{in}(x, y) + \varepsilon}, \quad \text{Eq. (8)}$$

wherein $\overline{L}_{in}(x,y)$ is the filter result of the input pixel on the x-th row and the y-th column of the image, and $\varepsilon$ is the positive value. $L_{in}^{max}$ is the maximum input luminance pixel value, and $\gamma_{max}(x,y)$ is the maximum weighting coefficient corresponding to the maximum input luminance pixel on the x-th row and the y-th column of the image.

According to an exemplary embodiment of the present invention, the pixel value adjustment circuit is further configured to generate Eq.(9) according to Eq.(3)-Eq.(8):

$$L_{out\_T_2}^{SDRCLCE} = \left\{ [g_4(\overline{L}_{in}, z)]^{-1} \left\{ \begin{array}{c} g_3(L_{in}, \overline{L}_{in})g_1(L_{in}, z) + \\ [1 - g_3(L_{in}, \overline{L}_{in})]g_2(L_{in}, z) \end{array} \right\} \right\}_0^1, \quad \text{Eq. (9)}$$
$$\equiv g(L_{in}, \overline{L}_{in}, z)$$

wherein $g_1(L_{in},z)$ is a function for computing the luminance remapping output value of the input pixels of the image; $g_2(L_{in},z)$ is a function for computing the local contrast enhancement component of the input pixels of the image; $g_3(L_{in},\overline{L}_{in})$ is a function for computing the weighting coefficient of the input pixels of the image; $g_4(\overline{L}_{in},z)$ is a function for computing the normalization factor.

According to an exemplary embodiment of the present invention, the pixel value adjustment circuit further includes a three-dimensional luminance lookup table (3D LLUT), wherein the 3D LLUT is constructed according to Eq.(9). Input indices of the 3D LLUT are the image-related parameter, the input luminance pixel value of the first input pixel, and the filter result of the first input pixel; an output of the 3D LLUT is the output luminance pixel value of the first input pixel.

According to an exemplary embodiment of the present invention, the pixel value adjustment circuit further includes a two-dimensional luminance lookup table (2D LLUT), wherein the 2D LLUT is constructed and updated according to Eq.(9) and the image-related parameter. Input indices of the 2D LLUT are the input luminance pixel value of the first input pixel and the filter result of the first input pixel; an output of the 2D LLUT is the output luminance pixel value of the first input pixel.

According to an exemplary embodiment of the present invention, the pixel value adjustment circuit further generates Eq.(10) according to Eq.(9):

$$\hat{L}_{out\_T_2}^{SDRCLCE} = \begin{cases} g_i(L_{in}, \overline{L}_{in}), & \text{if } w = 0 \\ (1 - w) \times g_i(L_{in}, \overline{L}_{in}) + \\ w \times g_{i+1}(L_{in}, \overline{L}_{in}), & \text{otherwise} \end{cases}, \quad \text{Eq. (10)}$$

wherein $g_i(L_{in},\overline{L}_{in})=g(L_{in},\overline{L}_{in},i/N-1)$. N is a finite integer satisfying $N \ge 2$, and i is an integer satisfying $0 \le i \le N-1$, and $w=z(N-1)-i$.

According to an exemplary embodiment of the present invention, the pixel value adjustment circuit further includes N two-dimensional luminance lookup tables. The N two-dimensional luminance lookup tables are constructed according to $g_i(L_{in},\overline{L}_{in})=g(L_{in},\overline{L}_{in},i/N-1)$, wherein N is the finite integer satisfying $N \ge 2$, and i is the integer satisfying $0 \le i \le N-1$. Input indices of the N two-dimensional luminance lookup tables are the input luminance pixel value of the first input pixel and the filter result of the first input pixel; an output of the N-two-dimensional luminance lookup tables is the output luminance pixel value of the first input pixel.

To sum up, by combining an image-dependent non-linear intensity-transfer function with a dynamic range compression with local contrast enhancement algorithm, the method and the image processing device for dynamic range compression with local contrast enhancement proposed in the exemplary embodiments of the present invention are able to simultaneously enhance image brightness and local contrast with detail and color preservation. Moreover, the processing speed of the dynamic range compression with local contrast enhancement algorithm may be drastically improved and the memory usage may be greatly reduced by leveraging a LLUT-indexing operation and/or a linear interpolation operation.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
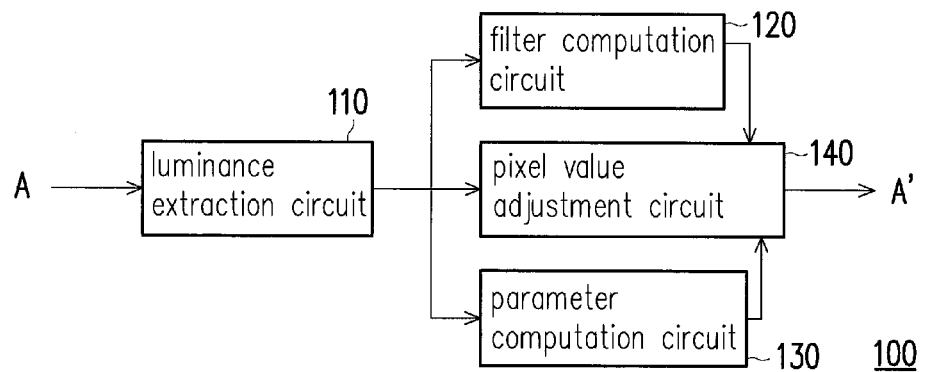
FIG. 1 depicts a block schematic diagram of an image processing device according to an exemplary embodiment of the present invention.

Reference will now be made in detail to the present embodiments of the invention, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the present invention.

The First Embodiment

FIG. 1 depicts a block schematic diagram of an image processing device according to an exemplary embodiment of the present invention. It should, however, be noted that this is merely an illustrative example and the present invention is not limited in this regard. All components of the image processing device and their configurations are first introduced in FIG. 1. The detailed functionalities of the components are disclosed along with FIG. 2.

Referring to FIG. 1, an image processing device 100 in the present embodiment receives an image A and outputs an image A'. The image processing device 100 performs dynamic range compression with local contrast enhancement on the image A so as to enhance detail of the image A, wherein an output of the image processing device 100 is the image A'. The image processing device 100 may be a personal computer, a laptop computer, a digital camera, a digital camcorder, a web camera, a smart phone, a tabular computer, a scanner, and so forth. However, the present invention is not limited thereto.

The image processing device 100 includes a luminance extraction circuit 110, a filter computation circuit 120, a parameter computation circuit 130, and a pixel value adjustment circuit 140, wherein the luminance extraction circuit 110, the filter computation circuit 120, the parameter computation 130, and the pixel value adjustment circuit 140 may be implemented as integrated circuits including a plurality of logic gates.

The luminance extraction circuit 110 receives a plurality of input pixels of the image A, wherein each of the input pixels includes at least one pixel value. In addition, the luminance extraction circuit 110 may perform color space transformation on the pixel values.

The filter computation circuit 120 is coupled to the luminance extraction circuit 110 and performs filter computation on the pixel values. The filter computation may lead to the computation such as a Gaussian distribution function, an average, and so forth. However, the present invention is not limited thereto.

The parameter computation circuit 130 is coupled to the luminance extraction circuit 110 and performs image-related computation based on an intensity level related to darkness (referred to as "darkness intensity level" hereinafter) of the input image A so as to obtain an image-related parameter.

The pixel value adjustment circuit 140 is coupled to the luminance extraction circuit 110, the filter computation circuit 120, and the parameter computation circuit 130 and may adjust the pixel values of the image A so as to produce the image A'.

The luminance extraction circuit 110, the filter computation circuit 120, the parameter computation circuit 130, and the pixel value adjustment circuit 140 are illustrated in detail as follows.

Figure 2:
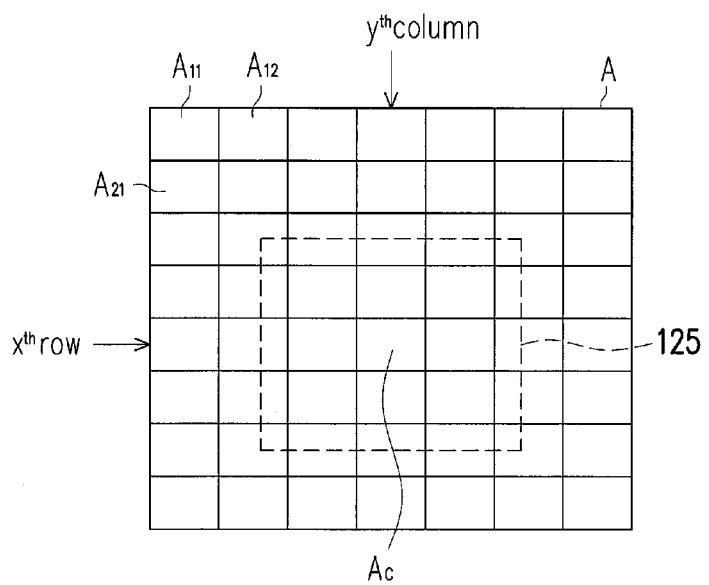
FIG. 2 depicts a schematic diagram of an image according to an exemplary embodiment of the present invention.

FIG. 2 depicts a schematic diagram of an image according to an exemplary embodiment of the present invention. Referring to both FIG. 1 and FIG. 2, the image A includes a plurality of input pixels arranged in a matrix with columns and rows. For example, an input pixel $A_{11}$ is the input pixel on the first row and the first column; an input pixel is $A_{12}$ the input pixel on the first row and the second column; an input pixel $A_{21}$ is the input pixel on the second row and the first column; and so forth. Each of the input pixels includes at least one pixel value. In the present embodiment, the image A is a color image in a red-green-blue (RGB) color space, wherein each of the pixels may include an R pixel value, a G pixel value, and a B pixel value. However, the present invention is not limited thereto. In other embodiments, each of the input pixels may be represented by a luminance component having a Y pixel value as well as a chrominance component represented by two coefficients, a Cb pixel value and a Cr pixel value in a YCbCr color space.

The luminance extraction circuit 110 receives the input pixels of the image A and obtains the pixel value of each of the input pixels. In the present embodiment, the pixel value is a V pixel value in a hue-saturation-value (HSV) color space and is defined as an "input luminance pixel value" hereinafter. Yet in other embodiments, the input luminance pixel value may be a pixel value in a NTSC standard or a sRGB standard transformed from a RGB standard.

The filter computation circuit 120 may perform the filter computation on the input luminance pixel values of the input pixels so as to obtain a filter result. For example, the filter computation circuit 120 may perform the filter computation according to a filter 125. Centering from an input pixel $A_C$ (defined as a "first input pixel" hereinafter), the filter 125 may be a Gaussian blur filter which performs a convolution operation on the input luminance pixel values of the input pixels within a range of the filter 125 based on a Gaussian distribution function in the present embodiment. However, the present invention is not limited thereto. In other embodiments, the filter 125 may be a mean filter, an edge-preserving filter, or other types of low-pass filters.

The parameter computation circuit 130 may perform the image-related computation based on the darkness intensity level of the image A so as to obtain the image-related parameter. In the present embodiment, the parameter computation circuit 130 may perform the image-related computation according to Eq.(1):

$$z = \begin{cases} 0 & \text{for } L \leq L_{min} \\ \dfrac{L - L_{min}}{L_{max} - L_{min}} & \text{for } L_{min} \leq L \leq L_{max} \\ 1 & \text{for } L > L_{max} \end{cases} \quad \text{Eq. (1)}$$

wherein $L_{min}$ and $L_{max}$ are positive integers and satisfy $0<L_{min}<L_{max}<L_{in}^{max}$, and $L_{in}^{max}$ is the maximum of the input luminance pixel values. z is the image-related parameter obtained based on a histogram of all the input luminance pixel values of the image A, and L is the darkness intensity level of the image A. $L_{min}$ and $L_{max}$ are threshold vales of the darkness intensity level and may be set by a user. For example, when $L_{min}$=50 and $L_{max}$=150, if the darkness intensity level of an input pixel is 25, such input pixel may be viewed as a dark pixel. On the other hand, if the darkness intensity level of an input pixel is 175, such input pixel may be viewed as a bright pixel. Moreover, the darkness intensity level L is determined by the input luminance pixel value corresponding to the value β of a cumulative distribution function (CDF) in the histogram, wherein $0 \leq \beta \leq 1$. For example, when more than $(1-\beta) \times 100\%$ of the input luminance pixel values of the input pixels are greater than $L_{max}$, the image-related parameter z is set to 1. When more than $(1-\beta) \times 100\%$ of the input luminance pixel values of the input pixels are less than $L_{min}$, the image-related parameter z is set to 0.

The pixel value adjustment circuit 140 may transform the input luminance pixel value of the first input pixel $A_C$, the image related parameter, a first parameter, and a second parameter to a luminance remapping output value according to a non-linear intensity-transfer function, wherein the second parameter is a dependent variable of the first parameter and is able to control a capability of dynamic range compression. Such non-linear intensity-transfer function is a monotonically increasing and first-order differentiable function, and an output thereof is the luminance remapping output value previously defined. For example, the non-linear intensity-transfer function may be Eq.(2):

$$T_2[L_{in}(x,y)] = \dfrac{1}{2}\left\{\begin{array}{l} L_{in}^{[(1-\varphi)z+\varphi]}(x,y) + L_{in}^{(2-z)}(x,y) + \\ S(1-z)L_{in}^{(\varphi+1)}(x,y)(1-L_{in}(x,y)) \end{array}\right\}, \quad \text{Eq. (2)}$$

wherein x and y are positive integers, and z is the image-related parameter. $L_{in}(x,y)$ is the input luminance pixel value of the input pixel on the x-th row and the y-th column. S is the first parameter and satisfies $0<S \leq 2$. φ is the second parameter and satisfies $0 \leq \varphi \leq \min(1,S)$ or $0 \leq \varphi \leq \Phi$, wherein Φ is the solution of the equation $\varphi(1+\epsilon)^{(\Phi-1)} - S = 0$, and ε is a small positive value to avoid dividing by zero.

Additionally, the image-related parameter z may change adaptively according to the histogram of all the input luminance pixel values of the image A. In other words, the darkness intensity level L is an indicator which is set according to $\beta \times 100\%$ of the input pixels. It is noted that, compared to the transfer function mentioned in the AINDANE algorithm, the non-linear transfer function in Eq.(2) may meet a zero-input zero-output condition. That is, when the input luminance pixel value is zero, the luminance remapping output value is also zero. This property may help achieving an acceptable dynamic range compression result with less color artifacts so as to solve the problem of over-enhancing dark regions of the image using the AINDANE algorithm.

According to a dynamic range compression with local contrast enhancement algorithm, the pixel value adjustment circuit 140 may further obtain an output luminance pixel value of the first input pixel $A_C$ based on a ratio of the input luminance pixel value of the first input pixel $A_C$ to a filter result of the first input pixel $A_C$, a luminance remapping output value of the first input pixel $A_C$ as well as a local contrast enhancement component. Such dynamic range compression with local contrast enhancement algorithm may include Eq.(3)-Eq.(7) as follows:

$$L_{out\_T_2}^{SDRCLCE}(x,y) = \left\{[f_n^{T_2}(x,y)]^{-1}\left\{\begin{array}{l} \gamma(x,y)L_{T_2}(x,y) + \\ [1-\gamma(x,y)]L_{lce}^{T_2}(x,y) \end{array}\right\}\right\}_0^1, \quad \text{Eq. (3)}$$

$$f_n^{T_2}(x,y) = \left\{\begin{array}{l} \gamma_{max}(x,y)T_2(L_{in}^{max}) + \\ [1-\gamma_{max}(x,y)][\alpha T_2'(L_{in}^{max})L_{in}^{max}] \end{array}\right\}_\varepsilon^1, \quad \text{Eq. (4)}$$

$$L_{T_2}(x,y) = T_2[L_{in}(x,y)], \quad \text{Eq. (5)}$$

$$L_{lce}^{T_2}(x,y) = \alpha T_2'[L_{in}(x,y)]L_{in}(x,y), \quad \text{Eq. (6)}$$

$$T_2'[L_{in}(x,y)] = \dfrac{1}{2}\left\{\begin{array}{l} [(1-\varphi)z+\varphi][L_{in}(x,y)+\varepsilon]^{[(1-\varphi)z+\varphi-1]} + \\ (2-z)L_{in}^{(1-z)}(x,y) + \\ S(1-z)L_{in}^{\varphi}(x,y)[(\varphi+1)(1-L_{in}(x,y))-L_{in}(x,y)] \end{array}\right\}, \quad \text{Eq. (7)}$$

wherein α is a third parameter with the value −1 or 1, $\{x\}_a^b$ is an operator representing that the value of x is bounded to the range $a \leq x \leq b$. $L_{out\_T_2}^{SDRCLCE}(x,y)$ is the output luminance pixel value of the input pixel on the x-th row and the y-th column of the image. $L_{T_2}(x,y)$ is the luminance remapping output value of the input pixel on the x-th row and the y-th column of the image. $L_{lce}^{T_2}(x,y)$ is the local contrast enhancement component on the x-th row and the y-th column of the image. $f_n^{T_2}(x,y)$ is a normalization factor on the x-th row and the y-th column of the image. $\gamma(x,y)$ is a weighting coefficient of the input pixel on the x-th row and the y-th column of the image and is defined as Eq.(8):

$$\gamma(x, y) = \frac{\overline{L}_{in}(x, y) + \varepsilon}{L_{in}(x, y) + \varepsilon}, \quad \text{Eq. (8)}$$

wherein $\overline{L}_{in}(x,y)$ is the filter result of the input pixel on the x-th row and the y-th column of the image, and $\varepsilon$ is a small positive value. $L_{in}^{max}$ is the maximum input luminance pixel value (i.e. the possible maximum of all the input luminance pixel values), and $\gamma_{max}(x,y)$ is a maximum weighting coefficient corresponding to the maximum input luminance pixel on the x-th row and the y-th column of the image. The output luminance pixel value generated from Eq.(3) may be applied to a follow-up color mapping algorithm, wherein the output image A' may be provided with dynamic range compression effectiveness with fine detail preservation.

It is noted that, in one of exemplary embodiments, the aforementioned input luminance pixel value is the V pixel value in the HSV color space, and yet the image A is in the RGB color space. Hence, the luminance extraction circuit 110 may transform the pixel values in the RGB color space into the V pixel values in the HSV color space.

Figure 3:
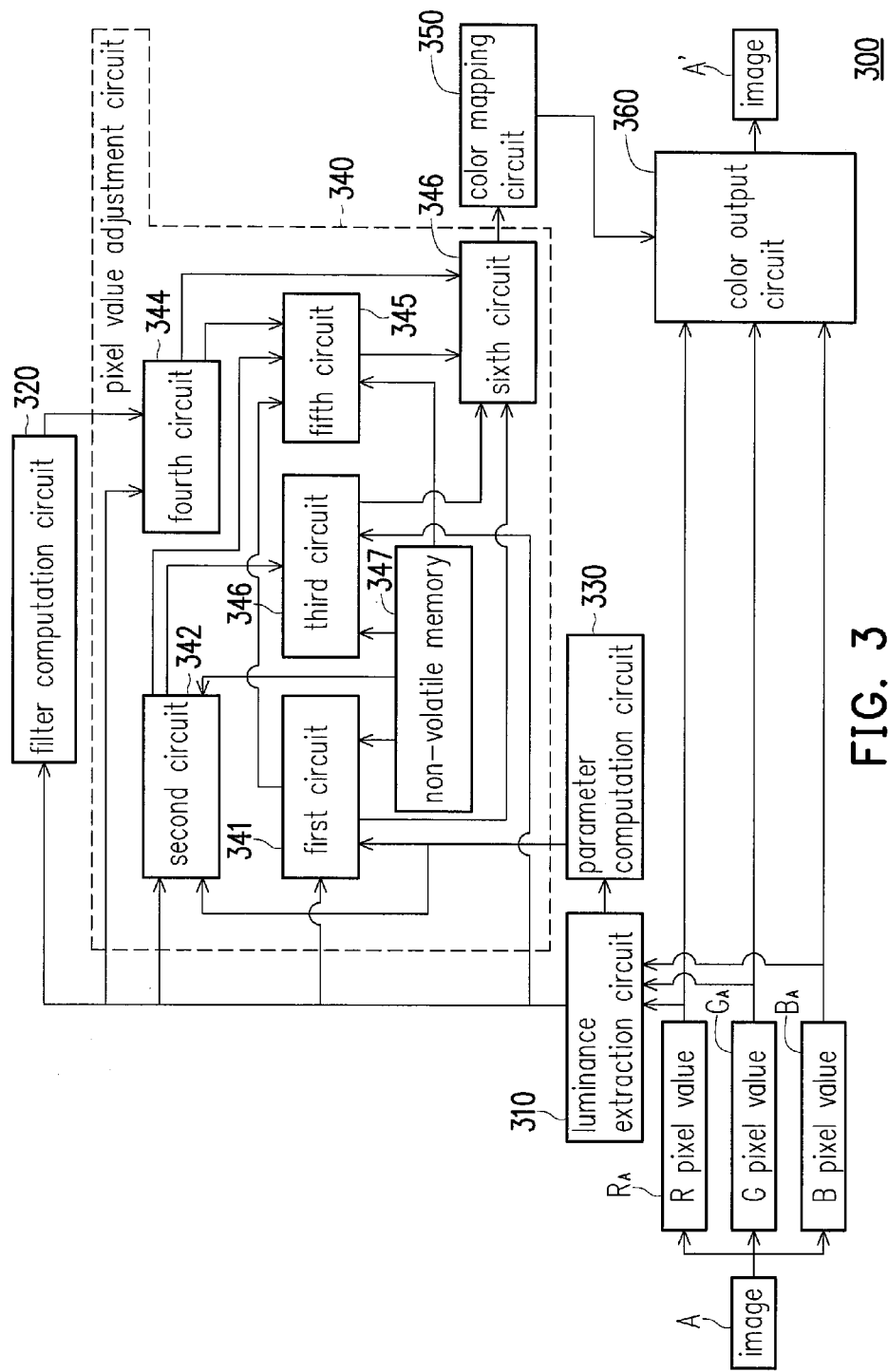
FIG. 3 depicts a block diagram of an image processing device according to an exemplary embodiment of the present invention.

FIG. 3 depicts a block diagram of an image processing device according to an exemplary embodiment of the present invention. Referring to FIG. 3, an image processing device 300 includes a luminance extraction circuit 310, a filter computation circuit 320, a parameter computation circuit 330, a pixel value adjustment circuit 340, a color mapping circuit 340, and a color output circuit 360, wherein the pixel value adjustment circuit 340 includes a first circuit 341, a second circuit 342, a third circuit 343, a fourth circuit 344, a fifth circuit 345, and a sixth circuit 346. Moreover, the pixel value adjustment circuit 340, the color mapping circuit 350, and the color output circuit 360 may be integrated circuits composed of, at least but not limited to, an adder, a subtractor, a multiplier, a divider, and/or an exponential multiplier.

In the present embodiment, the image A includes the input pixels in the RGB color space, and therefore the image A may be subdivided into R pixel values $R_A$, G pixel values $G_A$, and B pixel values $B_A$. The luminance extraction circuit 310 may transform the pixel values $R_A$, $G_A$, and $B_A$ in the RGB color space into the V pixel values in the HSV color space. In the following descriptions, only the input luminance pixel value $L_{in}$ of one of the input pixels will be illustrated. It is noted that, in the present embodiment, $L_{in}^{max}$ is the possible maximum of the input luminance pixel values of all the input pixels. Furthermore, in other embodiments, the luminance extraction circuit 310 may also transform the pixel values in the RGB color space into the pixel values in the NTSC standard or the sRGB standard. The present invention is not limited herein.

Then, the filter computation circuit 320 may perform the filter computation according to the luminance pixel value $L_{in}$ so as to generate the filter result $\overline{L}_{in}$. The parameter computation circuit 330 may obtain the darkness intensity level of the image A according to the input luminance pixel value $L_{in}$ and performs the image-related computation so as to obtain the image-related parameter z. The filter computation and the image-related computation have been previously illustrated and may not be repeated hereinafter.

Next, according to Eq.(2), the first circuit 341 may generate a luminance remapping output value $T_2$ and a maximum luminance remapping output value $T_{2\_max}$ based on the input luminance pixel value $L_{in}$, the maximum input luminance pixel value $L_{in}^{max}$, and the image-related parameter z output from the luminance extraction circuit 310 as well as the first parameter S and the second parameter $\phi$.

According to Eq.(7), the second circuit 342 may generate a non-linear intensity-transfer derivative function value $T_2'$ and a maximum non-linear intensity-transfer derivative function value $T_{2\_max}'$ based on the input luminance pixel value $L_{in}$, the maximum input luminance pixel value $L_{in}^{max}$, the image-related parameter z, the first parameter S, and the second parameter $\phi$ as well.

According to Eq.(6), the third circuit 343 may generate a local contrast enhancement component $L_{lce}^{T_2}$ based on the input luminance pixel value $L_{in}$, a non-linear intensity-transfer function value $T_2'$ and the third parameter $\alpha$.

According to Eq.(8), the fourth circuit 344 may generate a weighting coefficient $\gamma$ and a maximum weighting coefficient $\gamma_{max}$ based on the maximum input luminance pixel value $L_{in}^{max}$, the input luminance pixel value $L_{in}$, and the filter result $\overline{L}_{in}$.

According to Eq.(4), the fifth circuit 345 may generate a normalization factor $f_n^{T_2}$ based on a maximum weighting coefficient $\gamma_{max}$, the maximum non-linear intensity-transfer function value $T_{2\_max}'$, the maximum remapping output value $T_{2\_max}$, and the third parameter $\alpha$.

Next, according to Eq.(3), the sixth circuit 346 may generate an output luminance pixel value $L_{out\_T_2}^{SDRCLCE}$ based on the luminance remapping output value $T_2$, the local contrast enhancement component $L_{lce}^{T_2}$, the weighting coefficient $\gamma$, and the normalization factor $f_n^{T_2}$ output from the first circuit 341, the third circuit 343, the fourth circuit 344, and the fifth circuit 345 respectively.

Furthermore, the first parameter S, the second parameter $\phi$, and the third parameter $\alpha$ may be stored in a non-volatile memory 347 for the first circuit 341, the second circuit 342, the third circuit 343, and the fifth circuit 345 to use.

It is noted that, the output luminance pixel value $L_{out\_T_2}^{SDRCLCE}$ may be applied to the color mapping circuit 350 in a follow-up step so as to enhance the saturation of the image and output the pixel value in the YCbCr color space, which is the most commonly used color space in video rendering based on a digital video standard. For example, the output luminance pixel value $L_{out\_T_2}^{SDRCLCE}$ output from the sixth circuit 346 may be input to the color mapping circuit 350, and a color mapping ratio $\rho$ may be obtained according to Eq.(9):

$$\rho(x, y) = \frac{L_{out}(x, y) + \varepsilon}{L_{in}(x, y) + \varepsilon}, \quad \text{Eq. (9)}$$

wherein $\rho(x,y)$ is a color mapping ratio of the pixel on the x-th row and the y-th column of the image, and $L_{out}(x,y)$ is an output luminance pixel value of the pixel on the x-th row and the y-th column of the image. Next, the color mapping ratio $\rho$ may be input to the color output circuit 360.

The color output circuit 360 may transform the R pixel value $R_A$, the G pixel value $G_A$, and the B pixel value $B_A$ into the Y pixel value $Y_A$, the Cb pixel value $Cb_A$, and the Cr pixel value $Cr_A$. Moreover, the color output circuit 360 may further obtain an output luminance pixel value $Y_{out}$ of the Y component, an output color pixel value of the Cb component $C_{out}^b$, and an output color pixel value of the Cr component $C_{out}^r$ according to Eq.(10) and Eq.(11):

$$Y_{out}(x,y) = \rho(x,y)Y_{in}(x,y) + 16[1-\rho(x,y)], \quad \text{Eq.(10)}$$

$$C_{out}^i(x,y) = \rho(x,y)C_{in}^i(x,y) + 128[1-\rho(x,y)], \quad \text{Eq.(11)}$$

wherein i=b, r. $Y_{in}(x,y)$, $C_{in}^b(x,y)$, and $C_{in}^r(x,y)$ are the input luminance pixel values in the YCbCr color space, and $Y_{in}(x,y)$, $C_{out}^b(x,y)$, and $C_{out}^r(x,y)$ are the output luminance pixel values in the YCbCr color space. Accordingly, the output luminance pixel value of the Y component $Y_{out}$, the output color pixel value of the Cb component $C_{out}^b$, and the output color pixel value of the Cr component $C_{out}^r$ may form the image A' provided with dynamic range compression effectiveness with fine detail preservation.

Figure 4:
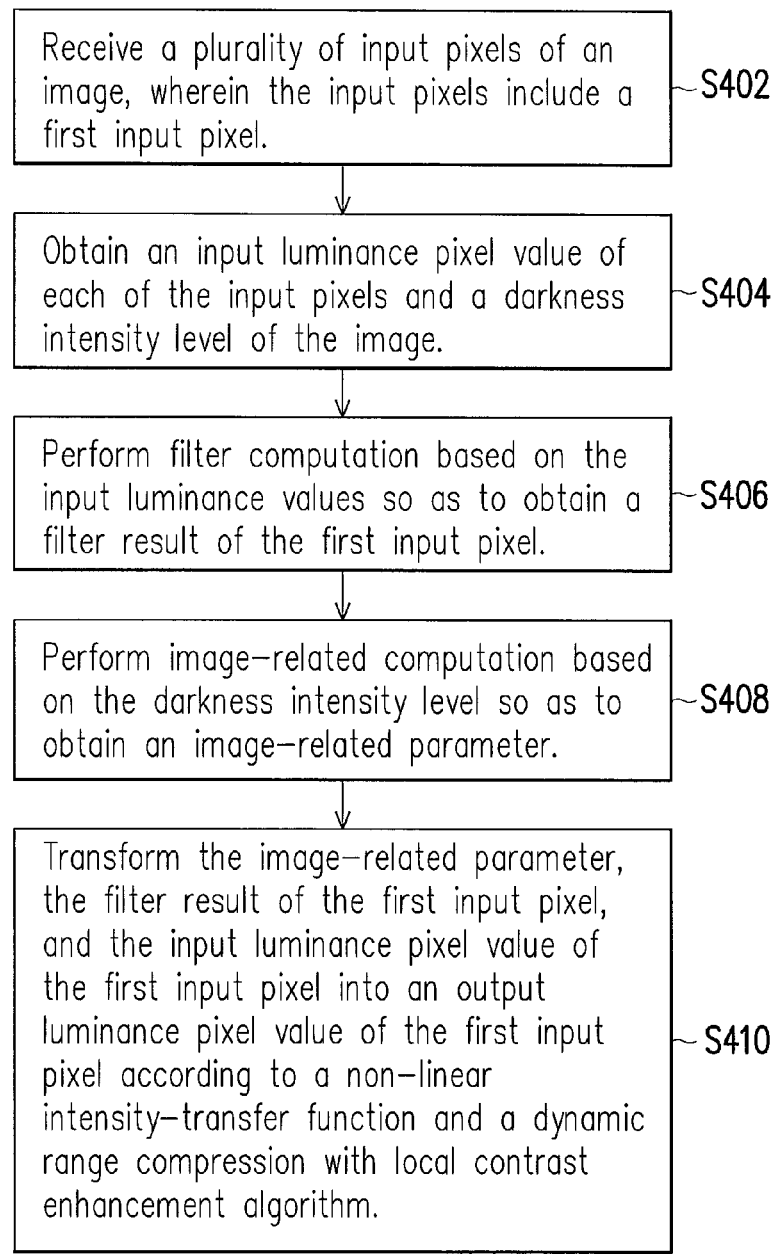
FIG. 4 illustrates a flowchart of a method for image dynamic range compression with local contrast enhancement according to an exemplary embodiment of the present invention.

FIG. 4 illustrates a flowchart of a method for image dynamic range compression with local contrast enhancement according to an exemplary embodiment of the present invention. Referring to FIG. 4, a plurality of input pixels of an image including a first input pixel are received in Step S402. An input luminance pixel value of each of the input pixels and a darkness intensity level of the image are obtained in Step S404. Filter computation is performed on the input luminance pixel values so as to obtain a filter result of the first input pixel in Step S406. Image-related computation is performed so as to obtain an image-related parameter based on the darkness intensity level in Step S408. The image-related parameter, the filter result of the first input pixel, and the input luminance pixel value of the first input pixel are transformed into an output luminance pixel value of the first input pixel according to a non-linear intensity-transfer function and a dynamic range compression with local contrast enhancement algorithm in Step S410. Each of the steps in FIG. 4 has been previously explained in detail and may not be repeated hereinafter.

The Second Embodiment

The second embodiment is similar to the first embodiment, and therefore only the differences will be described herein. In the second embodiment, the functionality of a pixel value adjustment circuit may be implemented as a three-dimensional luminance lookup table (3D LLUT) so as to accelerate the computation.

Figure 5:
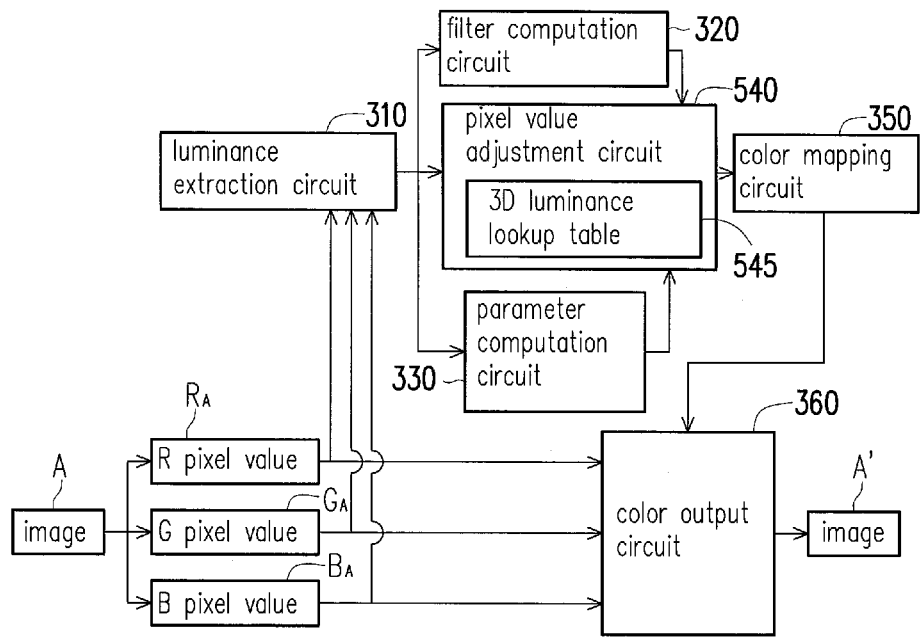
FIG. 5 depicts a block schematic diagram of an image processing device according to the second exemplary embodiment of the present invention.

FIG. 5 depicts a block diagram of an image processing device according to the second embodiment of the present invention. Referring to FIG. 5, an image processing device 500 includes the luminance extraction circuit 310, the filter computation circuit 320, the parameter computation circuit 330, a pixel value adjustment circuit 540, the color mapping circuit 350, and the color output circuit 360, wherein the functionalities of the luminance extraction circuit 310, the filter computation circuit 320, the parameter computation circuit 330, the color mapping circuit 350, and the color output circuit 360 have been explained in detail in the first embodiment and may not be repeated hereinafter. The pixel value adjustment circuit 540 includes a 3D LLUT 545, wherein the 3D LLUT 545 is constructed according to the dynamic range compression with local contrast enhancement algorithm, i.e. Eq.(3).

To be more specific, Eq.(3) depends on four conditions: the luminance remapping output $L_{T_2}$, the local contrast enhancement component $L_{lce}^{T_2}$, the normalization factor $f_n^{T_2}$, and the weighting coefficient $\gamma$. Suppose that the range compression parameter $\phi$ is a priori and is constant during the entire process. Then, according to Eq.(5), the luminance remapping output $L_{T_2}$ may be simplified to Eq.(12):

$$L_{T_2}=T_2[L_{in}]=g_1(L_{in},z), \qquad \text{Eq.(12)}$$

wherein $g_1(L_{in},z)$ is a two-variable function of the input luminance value $L_{in}$ and the image-related parameter z. Also, the local contrast enhancement component $L_{lce}^{T_2}$ may be simplified to Eq.(13):

$$L_{lce}^{T_2}=\alpha T_2'[L_{in}]L_{in}=g_2(L_{in},z), \qquad \text{Eq.(13)}$$

wherein $g_2(L_{in},z)$ is a two-variable function of the input luminance value $L_{in}$ and the image-related parameter z as well. The weighting coefficient $\gamma$ may be simplified to Eq.(14):

$$\gamma = \frac{L_{in}+\varepsilon}{\overline{L}_{in}+\varepsilon} = g_3(L_{in},\overline{L}_{in}), \qquad \text{Eq. (14)}$$

wherein $g_3(L_{in},\overline{L}_{in})$ is a two-variable function of the input luminance value $L_{in}$ and the filter result $\overline{L}_{in}$. The normalization factor $f_n^{T_2}$ may be simplified to Eq.(15):

$$f_n^{T_2}(x,y)=g_4(\overline{L}_{in},z), \qquad \text{Eq.(15)}$$

wherein $g_4(\overline{L}_{in},z)$ is a two-variable function of the filter result $\overline{L}_{in}$ and the image-related parameter z. By substituting Eq.(12)-Eq.(15) into Eq.(3), the dynamic range compression with local contrast enhancement algorithm may be rewritten as Eq.(16):

$$L_{out\_T_2}^{SDRCLCE} = \left\{ [g_4(\overline{L}_{in},z)]^{-1} \left\{ \begin{array}{l} g_3(L_{in},\overline{L}_{in})g_1(L_{in},z)+ \\ [1-g_3(L_{in},\overline{L}_{in})]g_2(L_{in},z) \end{array} \right\} \right\}_0^1, \qquad \text{Eq. (16)}$$

$$\equiv g(L_{in},\overline{L}_{in},z)$$

wherein $g(L_{in},\overline{L}_{in},z)$ is a three-variable function of the input luminance value $L_{in}$, the filter result $\overline{L}_{in}$, and the image-related parameter z.

The luminance value in digital video standards is generally an 8-bit digital signal, and the input luminance value $L_{in}$, the filter result $\overline{L}_{in}$, and the darkness intensity level L are within a fixed range such as 0-255. Based on this observation, the output of Eq.(16) may be pre-computed when the dynamic range compression parameter $\phi$ is a decided priori and constant throughout the entire process.

To be more specific, Eq.(16) may be used to pre-construct a 256-by-256-by-256 3D LLUT 545, wherein input indices of the 3D LLUT 545 are the input luminance value $L_{in}$, the filter result $\overline{L}_{in}$, and the image-related parameter z, and an output of the 3D LLUT 545 is the output luminance pixel value $L_{out\_T_2}^{SDRCLCE}$.

In other words, the method for image dynamic range compression with local contrast enhancement in the present embodiment may simplify the process of the non-linear intensity-transfer function and the dynamic range compression with local contrast enhancement algorithm to a 3D LLUT-indexing operation and further speed up the entire process of the dynamic range compression with local contrast enhancement algorithm.

The Third Embodiment

The third embodiment is similar to the second embodiment, and therefore only the difference will be described herein. In the third embodiment, the functionality of a pixel value adjustment circuit may be implemented as a 2-dimensional luminance lookup table (2D LLUT) so as to reduce the memory usage.

Figure 6:
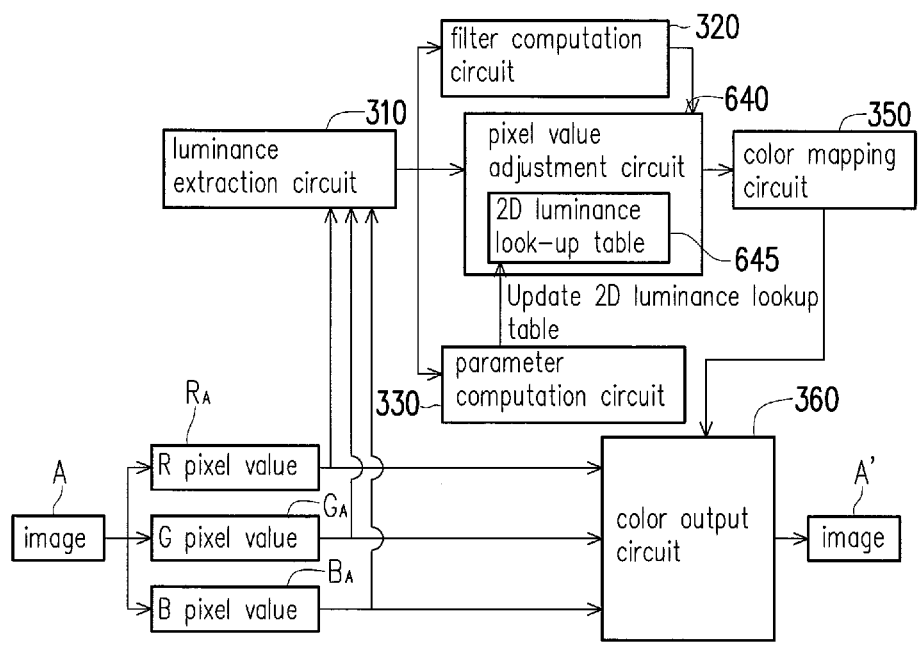
FIG. 6 depicts a block schematic diagram of an image processing device according to the third exemplary embodiment of the present invention.

FIG. 6 depicts a block schematic diagram of an image processing device according to the third embodiment of the present invention. Referring to FIG. 6, an image processing device 600 includes the luminance extraction circuit 310, the filter computation circuit 320, the parameter computation circuit 330, a pixel value adjustment circuit 640, the color mapping circuit 350, and the color output circuit 360, wherein the functionalities of the luminance extraction circuit 310, the filter computation circuit 320, the parameter computation circuit 330, the color mapping circuit 350, and the color output circuit 360 have been explained in detail in the first embodiment and may not be repeated hereinafter. The pixel value adjustment circuit 640 includes a 2D LLUT 645, wherein the 2D LLUT 645 is constructed according to Eq. (16).

To be more specific, according to the second embodiment, Eq.(16) may be used to pre-construct the 256-by-256-by-256 3D LLUT 545, wherein the input indices of the 3D LLUT 545 are the input luminance value $L_{in}$, the filter result $\overline{L}_{in}$, and the image-related parameter z. When the image-related parameter z is constant, the 3D LLUT 545 may be reduced to the 256-by-256 2D LLUT 645. Compared to the 3D LLUT with a large memory size, the 2D LLUT 645 in the present embodiment efficiently reduces the memory usage from 16 MB to 65K.

When different images are input, darkness intensity levels of the images may be different so that the image-related parameter z may change. When the image-related parameter z changes, the 2D LLUT 645 may require to be updated. Hence, the proposed method in the present embodiment may be more suitable to a single image. In terms of real-time video signal processing, a new acceleration method will be proposed in the fourth embodiment.

The Fourth Embodiment

The fourth embodiment is similar to the second embodiment, and therefore only the difference will be described herein. In the fourth embodiment, the functionality of a pixel value adjustment circuit may be implemented as a plurality of 2D LLUTs so as to reduce the memory usage as well as speed up the computation.

Figure 7:
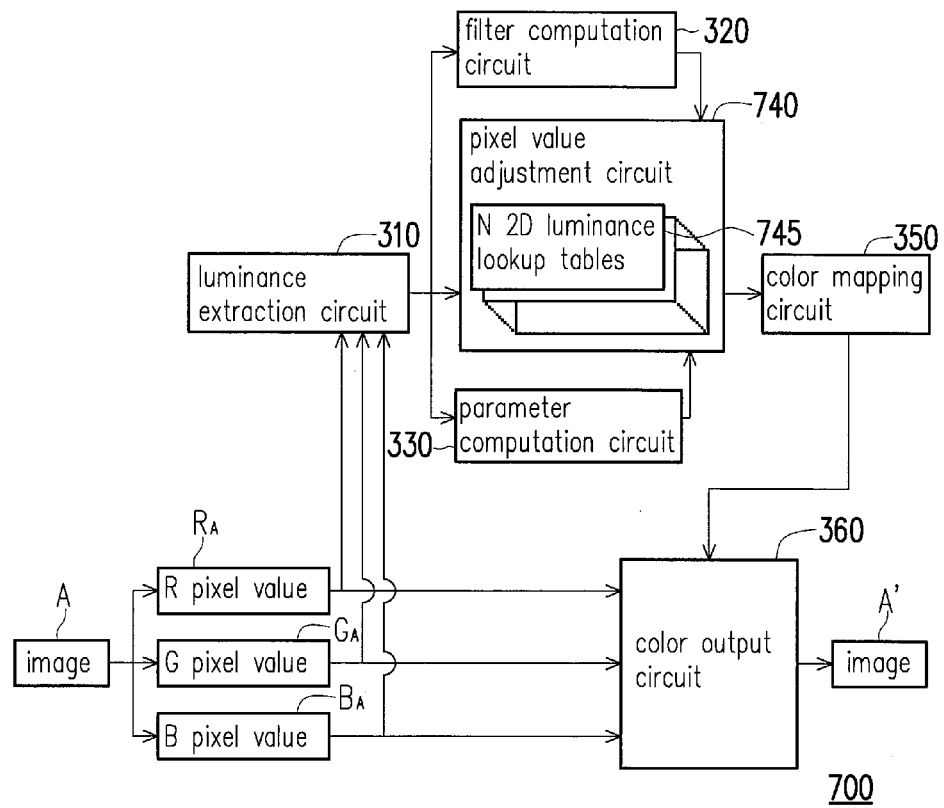
FIG. 7 depicts a block schematic diagram of an image processing device according to the fourth exemplary embodiment of the present invention.

FIG. 7 depicts a block schematic diagram of an image processing device according to the fourth embodiment of the present invention. Referring to FIG. 7, an image processing device 700 includes the luminance extraction circuit 310, the filter computation circuit 320, the parameter computation circuit 330, a pixel value adjustment circuit 740, the color mapping circuit 350, and the color output circuit 360, wherein the functionalities of the luminance extraction circuit 310, the filter computation circuit 320, the parameter computation circuit 330, the color mapping circuit 350, and the color output circuit 360 have been explained in detail in the first embodiment and may not be repeated hereinafter. The pixel value adjustment circuit 740 includes N two-dimensional lookup tables 745, wherein the N two-dimensional lookup tables 745 may be derived and constructed according to Eq. (16), and N≥2.

To be specific, since the image-related parameter z ranges from 0 to 1, Eq.(16) may be rewritten as Eq.(17):

$$g_i(L_{in}, \overline{L}_{in}) \equiv g(L_{in}, \overline{L}_{in}, i/N-1), \qquad \text{Eq.(17)}$$

wherein N and i are integers, N≥2, and i=0, 1, ..., N−1. It is noted that, if N→∞, then $g_1(L_{in}, \overline{L}_{in})$ is equivalent to $g(L_{in}, \overline{L}_{in}, z)|_{z \in [0,1]}$. By contrast, if N is a finite positive integer, Eq.(17) is a discrete version of Eq.(16) with N samples. This observation is useful to develop an efficient approximation method to speed up the dynamic range compression with local contrast enhancement algorithm with less memory usage.

To be more specific, assume that i=⌊z(N−1)⌋, wherein ⌊X⌋ means the largest integer less than or equal to X. Then, Eq. (17) may be approximated by linear interpolation of a discrete function such as Eq.(18):

$$\hat{L}_{out\_T_2}^{SDRCLCE} = \qquad \text{Eq. (18)}$$

$$\begin{cases} g_i(L_{in}, \overline{L}_{in}), & \text{if } w = 0 \\ (1-w) \times g_i(L_{in}, \overline{L}_{in}) + w \times g_{i+1}(L_{in}, \overline{L}_{in}), & \text{otherwise} \end{cases},$$

wherein w=z(N−1)−i. For example, if the image-related parameter z is 0.1 and the finite integer N is 4, then i=0 and w=0.3. That is, the output luminance value $\hat{L}_{out\_T_2}^{SDRCLCE}$ approximated by a linear interpolation operation is between the outputs of $g_0(L_{in}, \overline{L}_{in})$ and $g_1(L_{in}, \overline{L}_{in})$, i.e.

$$\hat{L}_{out\_T_2}^{SDRCLCE} = 0.3 g_0(L_{in}, \overline{L}_{in}) + 0.7 g_1(L_{in}, \overline{L}_{in}).$$

Similarly, each output of the functions $g_i(L_{in}, \overline{L}_{in})$, for i=0, 1, ..., N−1, may be pre-computed in a N-by-256-by-256 3D LLUT. In terms of Eq.(18), the computation of the non-linear intensity-transfer function and the dynamic range compression with local contrast enhancement algorithm may be simplified to two 2D LLUT-indexing operations and a linear interpolation operation.

The memory usage of the linear interpolation operation is dependent on the layer-number N of the 2D LLUT. In one of exemplary embodiments in the present invention, a mean square error (MSE) between an output luminance pixel value approximated by the linear interpolation operation $\hat{L}_{out\_T_2}^{SDRCLCE}$ (referred to as an "estimated output luminance pixel value" hereinafter) and the output luminance pixel value $L_{out\_T_2}^{SDRCLCE}$ may be computed so as to find the minimum layer-number N with an acceptable approximation. The MSE between the estimated output luminance pixel value $\hat{L}_{out\_T_2}^{SDRCLCE}$ and the output luminance pixel value $L_{out\_T_2}^{SDRCLCE}$ may be defined as Eq.(19):

$$MSE = \frac{1}{UV} \sum_{x=1}^{U} \sum_{y=1}^{V} \left[ L_{out\_T_2}^{SDRCLCE}(x,y) - \hat{L}_{out\_T_2}^{SDRCLCE}(x,y) \right]^2, \qquad \text{Eq. (19)}$$

wherein U and V are the total column and row number of the image respectively. When N≥5, the MSE between the estimated output luminance pixel value $\hat{L}_{out\_T_2}^{SDRCLCE}$ and the output luminance pixel value $L_{out\_T_2}^{SDRCLCE}$ may converge to a small value. Therefore, the minimum layer-number N for the linear interpolation operation may be set to five layers. However, the present invention is not limited to use the MSE between the estimated output luminance pixel value $\hat{L}_{out\_T_2}^{SDRCLCE}$ and the output luminance pixel value $L_{out\_T_2}^{SDRCLCE}$ to approximate the minimum layer-number N. In other embodiments, the minimum layer-number N (N≥2) may also be computed based on the estimated output luminance pixel value $\hat{L}_{out\_T_2}^{SDRCLCE}$ and the output luminance pixel value $L_{out\_T_2}^{SDRCLCE}$ by leveraging other statistical algorithms.

To be more specific, Eq.(17) may be pre-constructed to a 2D LLUT 745 with at least two layers, wherein input indices of the 2D LLUT 745 are the input luminance value $L_{in}$ and the filter result $\overline{L}_{in}$, and an output of the 2D LLUT 745 is the output luminance pixel value $L_{out\_T_2}^{SDRCLCE}$.

In other words, the method for image dynamic range compression with local contrast enhancement in the present embodiment may simplify the process of non-linear intensity-transfer function and the dynamic range compression with local contrast enhancement algorithm to a 2D LLUT-indexing operation and a linear interpolation operation. The method not only drastically improves the processing speed for computing the dynamic range compression with local contrast enhancement algorithm but also greatly reduces the memory usage from 16M to at least 131K when compared to the method using the 3D LLUT.

To sum up, by combining an image-dependent non-linear intensity-transfer function with a dynamic range compression with local contrast enhancement algorithm, the method and the image processing device for dynamic range compression with local contrast enhancement proposed in the exemplary embodiments of the present invention are able to simultaneously enhance image brightness and local contrast with detail and color preservation. Moreover, the processing speed of the dynamic range compression with local contrast enhancement algorithm may be drastically improved and the memory usage may be greatly reduced by leveraging a LLUT-indexing operation and a linear interpolation operation. The method and the image processing device for dynamic range compression with local contrast enhancement not only produce satisfactory color enhancement results but also achieve real-time performance in processing high-definition video streams. The applicability of the present invention in practical application is greatly increased especially for consumer electronic products with low costs.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for image dynamic range compression with local contrast enhancement, adapted to an image processing device having a processor, comprising:
   receiving a plurality of input pixels of an image, wherein the input pixels comprise a first input pixel by the processor;
   obtaining an input luminance pixel value of each of the input pixels and a darkness intensity level of the image by the processor;
   performing filter computation by the processor based on the input luminance pixel values of the input pixels so as to obtain a filter result of the first input pixel;
   performing image-related computation by the processor based on the darkness intensity level of the image so as to obtain an image-related parameter;
   transforming the input luminance pixel value of the first input pixel, the image-related parameter, a first parameter, and a second parameter into a luminance remapping output value of the first input pixel by the processor according to a non-linear intensity-transfer function, wherein the second parameter is a dependent variable of the first parameter, and wherein when the input luminance pixel value of the first input pixel is equal to 0, the luminance remapping output value is 0; and
   obtaining an output luminance pixel value of the first input pixel by the processor according to a dynamic range compression with local contrast enhancement algorithm based on a ratio of the input luminance pixel value of the first input pixel to the filter result of the first input pixel, the luminance remapping output value of the first input pixel, and a local contrast enhancement component of the first input pixel, wherein the local contrast enhancement component is a multiplication of the input luminance pixel value of the first input pixel and a derivative function of the non-linear intensity-transfer function of the first input pixel.

2. The method for image dynamic range compression with local contrast enhancement in claim 1, wherein the formula to obtain the image-related parameter by performing the image-related computation based on the darkness intensity level of the image is represented as Eq.(1):

$$z = \begin{cases} 0 & \text{for } L \leq L_{min} \\ \dfrac{L - L_{min}}{L_{max} - L_{min}} & \text{for } L_{min} \leq L \leq L_{max} , \\ 1 & \text{for } L > L_{max} \end{cases} \quad \text{Eq. (1)}$$

wherein L is the darkness intensity level of the image, z is the image-related parameter, $L_{min}$ and $L_{max}$ are positive integers and satisfy $0 < L_{min} < L_{max} < L_{in}^{max}$, and wherein $L_{in}^{max}$ is the maximum of the input luminance pixel values.

3. The method for image dynamic range compression with local contrast enhancement in claim 2, wherein the non-linear intensity-transfer function for transforming the input luminance pixel value of the first input pixel, the image-related parameter, the first parameter, and the second parameter into the luminance remapping output value of the first input pixel is represented as Eq.(2):

$$T_2[L_{in}(x,y)] = \frac{1}{2}\left\{ \begin{array}{l} L_{in}^{[(1-\varphi)z+\varphi]}(x,y) + L_{in}^{(2-z)}(x,y) + \\ S(1-z)L_{in}^{(\varphi+1)}(x,y)(1 - L_{in}(x,y)) \end{array} \right\}, \quad \text{Eq. (2)}$$

wherein x and y are positive integers, z is the image-related parameter, $L_{in}(x,y)$ is the input luminance pixel value of the input pixel on the x-th row and the y-th column of the image;
wherein S is the first parameter and satisfies $0 < S \leq 2$; and
wherein φ is the second parameter and satisfies $0 \leq \varphi \leq \min(1,S)$ or $0 \leq \varphi \leq \Phi$,
wherein Φ is a solution of $\varphi(1+\epsilon)^{(\Phi-1)} - S = 0$, and ε is a positive value.

4. The method for image dynamic range compression with local contrast enhancement in claim 3, wherein the step of obtaining the output luminance pixel value of the first input pixel by the processor based on the ratio of the input luminance pixel value of the first input pixel to the filter result of the first input pixel, the luminance remapping output value of the first input pixel, and the local contrast enhancement component of the first input pixel according to the dynamic range compression with local contrast enhancement algorithm comprises:
   obtaining a non-linear intensity-transfer derivative function by the processor according to the non-linear intensity-transfer function, wherein the non-linear intensity-transfer derivative function is a first-order derivative function of the non-linear intensity-transfer function with respect to the input luminance pixel value;
   substituting the first parameter, the second parameter, the image-related parameter, and the input luminance pixel value of the first input pixel into the non-linear intensity-transfer derivative function by the processor and obtaining a non-linear intensity-transfer derivative function result of the first input pixel by the processor according to an output of the non-linear intensity-transfer derivative function;
   obtaining the local contrast enhancement component of the first input pixel by the processor based on the output luminance pixel value of the first input pixel, the nonlinear intensity-transfer derivative function result of the first input pixel, and a third parameter;

obtaining a weighting coefficient of the first input pixel by the processor according to the input luminance pixel value of the first input pixel and the filter result of the first input pixel;

obtaining a normalization factor by the processor based on the third parameter, a maximum input luminance pixel value, a maximum weighting coefficient, and a maximum non-linear intensity-transfer derivative function result, wherein the maximum input luminance pixel value is the maximum of the input luminance pixel values, the maximum weighting coefficient corresponds to the weighting coefficient of the maximum input luminance pixel value, and the maximum non-linear intensity-transfer derivative function result corresponds to the non-linear intensity-transfer derivative function result of the maximum input luminance pixel value; and obtaining the output luminance pixel value of the first input pixel by the processor based on the luminance remapping output value of the first input pixel, the local contrast enhancement component of the first input pixel, the weighting coefficient of the first input pixel, and the normalization factor according to the dynamic range compression and local contrast enhancement algorithm.

5. The method for image dynamic range compression with local contrast enhancement in claim 4, wherein the formulas of the dynamic range compression with local contrast enhancement algorithm to obtain the output luminance pixel value of the first input pixel based on the ratio of the input luminance pixel value of the first input pixel to the filter result of the first input pixel, the luminance remapping output value of the first input pixel, and the local contrast enhancement component of the first input pixel are represented as Eq.(3)-Eq(7):

$$L_{out\_T_2}^{SDRCLCE}(x, y) = \left\{ [f_n^{T_2}(x, y)]^{-1} \left\{ \begin{array}{c} \gamma(x, y)L_{T_2}(x, y) + \\ [1 - \gamma(x, y)]L_{lce}^{T_2}(x, y) \end{array} \right\} \right\}_0^1, \quad \text{Eq. (3)}$$

$$f_n^{T_2}(x, y) = \left\{ \begin{array}{c} \gamma_{max}(x, y)T_2(L_{in}^{max}) + \\ [1 - \gamma_{max}(x, y)][\alpha T_2'(L_{in}^{max})L_{in}^{max}] \end{array} \right\}_\varepsilon^1, \quad \text{Eq. (4)}$$

$$L_{T_2}(x, y) = T_2[L_{in}(x, y)], \quad \text{Eq. (5)}$$

$$L_{lce}^{T_2}(x, y) = \alpha T_2'[\overline{L}_{in}(x, y)]L_{in}(x, y), \quad \text{Eq. (6)}$$

$$T_2'[L_{in}(x, y)] = \quad \text{Eq. (7)}$$

$$\frac{1}{2} \left\{ \begin{array}{c} [(1-\varphi)z + \varphi][L_{in}(x, y) + \varepsilon]^{[(1-\varphi)z+\varphi-1]} + \\ (2-z)L_{in}^{(1-z)}(x, y) + \\ S(1-z)L_{in}^\varphi(x, y)[(\varphi+1)(1-L_{in}(x, y)) - L_{in}(x, y)] \end{array} \right\},$$

wherein $\alpha$ is the third parameter with the value −1 or 1, $\{x\}_a^b$ is an operator representing that the value of x is bounded to the range $a \le x \le b$, $L_{out\_T_2}^{SDRCLCE}(x,y)$ is the output luminance pixel value of the input pixel on the x-th row and the y-th column of the image, $L_{T_2}(x,y)$ is the luminance remapping output value of the input pixel on the x-th row and the y-th column of the image, $L_{lce}^{T_2}(x,y)$ is the local contrast enhancement component on the x-th row and the y-th column of the image, $f_n^{T_2}(x,y)$ is the normalization factor on the x-th row and the y-th column of the image, and $\gamma(x,y)$ is the weighting coefficient of the input pixel on the x-th row and the y-th column of the image and is defined as Eq.(8):

$$\gamma(x, y) = \frac{L_{in}(x, y) + \varepsilon}{\overline{L}_{in}(x, y) + \varepsilon}, \quad \text{Eq. (8)}$$

wherein $\overline{L}_{in}(x,y)$ is the filter result of the input pixel on the x-th row and the y-th column of the image, $\varepsilon$ is the positive value, $L_{in}^{max}$ is the maximum input luminance pixel value, and $\gamma_{max}(x,y)$ is the maximum weighting coefficient corresponding to the maximum input luminance pixel on the x-th row and the y-th column of the image.

6. The method for image dynamic range compression with local contrast enhancement in claim 4 further comprising:

generating Eq.(9) by the processor according to Eq.(3)-Eq.(8):

$$L_{out\_T_2}^{SDRCLCE} = \left\{ [g_4(\overline{L}_{in}, z)]^{-1} \left\{ \begin{array}{c} g_3(L_{in}, \overline{L}_{in})g_1(L_{in}, z) + \\ [1 - g_3(L_{in}, \overline{L}_{in})]g_2(L_{in}, z) \end{array} \right\} \right\}_0^1, \quad \text{Eq. (9)}$$

$$\equiv g(L_{in}, \overline{L}_{in}, z)$$

wherein $g_1(L_{in},z)$ is a function for computing the luminance remapping output value of the input pixels of the image, $g_2(L_{in},z)$ is a function for computing the local contrast enhancement component of the input pixels of the image, $g_3(L_{in},\overline{L}_{in})$ is a function for computing the weighting coefficient of the input pixels of the image, $g_4(\overline{L}_{in},z)$ is a function for computing the normalization factor.

7. The method for image dynamic range compression with local contrast enhancement in claim 6 further comprising:

constructing a three-dimensional luminance lookup table (3D LLUT) by the processor according to Eq.(9) so as to obtain the output luminance pixel value of the first input pixel, wherein input indices of the 3D LLUT are the image-related parameter, the input luminance pixel value of the first input pixel, and the filter result of the first input pixel.

8. The method for image dynamic range compression with local contrast enhancement in claim 6 further comprising:

constructing and updating a two-dimensional luminance lookup table (2D LLUT) by the processor according to Eq.(9) and the image-related parameter so as to obtain the output luminance pixel value of the first input pixel, wherein input indices of the 2D LLUT are the input luminance pixel value of the first input pixel and the filter result of the first input pixel.

9. The method for image dynamic range compression with local contrast enhancement in claim 6 further comprising:

generating Eq.(10) by the processor according to Eq.(9):

$$\hat{L}_{out\_T_2}^{SDRCLCE} = \quad \text{Eq. (10)}$$

$$\left\{ \begin{array}{ll} g_i(L_{in}, \overline{L}_{in}), & \text{if } w = 0 \\ (1-w) \times g_i(L_{in}, \overline{L}_{in}) + w \times g_{i+1}(L_{in}, \overline{L}_{in}), & \text{otherwise} \end{array} \right.,$$

wherein $g_i(L_{in},\overline{L}_{in})=g(L_{in},\overline{L}_{in},i/N-1)$, N is a finite integer satisfying $N \ge 2$, i is an integer satisfying $0 \le i \le N-1$, and $w=z(N-1)-i$.

10. The method for image dynamic range compression with local contrast enhancement in claim 9 further comprising:

constructing N two-dimensional luminance lookup tables by the processor according to $g_i(L_{in},\overline{L}_{in})=g(L_{in},\overline{L}_{in},i/N-1)$ so as to obtain the output luminance pixel value of the first input pixel, wherein input indices of the N two-dimensional luminance lookup tables are the input luminance pixel value of the first input pixel and the filter result of the first input pixel, and wherein N is the finite integer satisfying N≥2, and i is the integer satisfying 0≤i≤N−1.

11. An image processing device comprising:
a luminance extraction circuit, configured to receive a plurality of input pixels of an image as well as obtain an input luminance pixel value of each of the input pixels and a darkness intensity level of the image, wherein the input pixels comprise a first input pixel;
a filter computation circuit, coupled to the luminance extraction circuit, configured to perform filter computation based on the input luminance pixel values of the input pixels so as to obtain a filter result of the first input pixel;
a parameter computation circuit, coupled to the luminance extraction circuit and configured to perform image-related computation based on the darkness intensity level of the image so as to obtain an image-related parameter; and
a pixel value adjustment circuit, coupled to the luminance extraction circuit, the filter computation circuit, and the parameter computation circuit, and configured to transform the input luminance pixel value of the first input pixel, the image-related parameter, a first parameter, and a second parameter into a luminance remapping output value of the first input pixel according to a non-linear intensity-transfer function as well as obtain an output luminance pixel value of the first input pixel according to a dynamic range compression with local contrast enhancement algorithm based on a ratio of the input luminance pixel value of the first input pixel to the filter result of the first input pixel, the luminance remapping output value of the first input pixel, and a local contrast enhancement component of the first input pixel,
wherein the second parameter is a dependent variable of the first parameter, and wherein when the input luminance pixel value of the first input pixel is equal to 0, the luminance remapping output value is 0,
wherein the local contrast enhancement component is a multiplication of the input luminance pixel value of the first input pixel and a derivative function of the non-linear intensity-transfer function of the first input pixel.

12. The image processing device in claim 11, wherein the parameter computation circuit is configured to perform the image-related computation based on the darkness intensity level of the image so as to obtain the image-related parameter according to Eq.(1):

$$z = \begin{cases} 0 & \text{for } L \leq L_{min} \\ \dfrac{L-L_{min}}{L_{max}-L_{min}} & \text{for } L_{min} \leq L \leq L_{max} \\ 1 & \text{for } L > L_{max} \end{cases} \quad \text{Eq. (1)}$$

wherein L is the darkness intensity level of the image, z is the image-related parameter, $L_{min}$ and $L_{max}$ are positive integers and satisfy $0<L_{min}<L_{max}<L_{in}^{max}$, and wherein $L_{in}^{max}$ is the maximum of the input luminance pixel values.

13. The image processing device in claim 12, wherein the non-linear intensity-transfer function to transform the input luminance pixel value of the first input pixel, the image-related parameter, the first parameter, and the second parameter into the luminance remapping output value of the first input pixel by the pixel value adjustment circuit is represented as Eq.(2):

$$T_2[L_{in}(x,y)] = \frac{1}{2}\left\{ \begin{array}{l} L_{in}^{[(1-\varphi)z+\varphi]}(x,y) + L_{in}^{(2-z)}(x,y) + \\ S(1-z)L_{in}^{(\varphi+1)}(x,y)(1-L_{in}(x,y)) \end{array} \right\}, \quad \text{Eq. (2)}$$

wherein x and y are positive integers, z is the image-related parameter, $L_{in}(x,y)$ is the input luminance pixel value of the input pixel on the x-th row and the y-th column of the image;
wherein S is the first parameter and satisfies 0<S≤2; and
wherein φ is the second parameter and satisfies 0≤φ≤min (1,S) or 0≤φ≤Φ,
wherein Φ is a solution of $\phi(1+\epsilon)^{(\Phi-1)}-S=0$, and ε is a positive value.

14. The image processing device in claim 13, wherein the pixel value adjustment circuit is further configured to obtain a non-linear intensity-transfer derivative function according to the non-linear intensity-transfer function, wherein the non-linear intensity-transfer derivative function is a first-order derivative function of the non-linear intensity-transfer function with respect to the input luminance pixel value;
wherein the pixel value adjustment circuit is further configured to substitute the first parameter, the second parameter, the image-related parameter, and the input luminance pixel value of the first input pixel into the non-linear intensity-transfer derivative function as well as obtain a non-linear intensity-transfer derivative function result of the first input pixel according to an output of the non-linear intensity-transfer derivative function;
wherein the pixel value adjustment circuit is further configured to obtain the local contrast enhancement component of the first input pixel based on the output luminance pixel value of the first input pixel, the non-linear intensity-transfer derivative function result of the first input pixel, and a third parameter;
wherein the pixel value adjustment circuit is further configured to obtain a weighting coefficient of the first input pixel according to the input luminance pixel value of the first input pixel and the filter result of the first input pixel;
wherein the pixel value adjustment circuit is further configured to obtain a normalization factor based on the third parameter, a maximum input luminance pixel value, a maximum weighting coefficient, and a maximum non-linear intensity-transfer derivative function result, wherein the maximum input luminance pixel value is the maximum of the input luminance pixel values, the maximum weighting coefficient corresponds to the weighting coefficient of the maximum input luminance pixel value, and the maximum non-linear intensity-transfer derivative function result corresponds to the non-linear intensity-transfer derivative function result of the maximum input luminance pixel value; and
wherein the pixel value adjustment circuit is further configured to obtain the output luminance pixel value of the first input pixel based on the luminance remapping output value of the first input pixel, the local contrast enhancement component of the first input pixel, the weighting coefficient of the first input pixel, and the normalization factor according to the dynamic range compression and local contrast enhancement algorithm.

15. The image processing device in claim 14, wherein the dynamic range compression and local contrast enhancement algorithm to obtain the output luminance pixel value of the first input pixel by the pixel value adjustment circuit is represented as Eq.(3)-Eq.(7):

$$L_{out\_T_2}^{SDRCLCE}(x,y) = \left\{ [f_n^{T_2}(x,y)]^{-1} \left\{ \begin{array}{c} \gamma(x,y)L_{T_2}(x,y) + \\ [1-\gamma(x,y)]L_{lce}^{T_2}(x,y) \end{array} \right\} \right\}_0^1, \quad \text{Eq. (3)}$$

$$f_n^{T_2}(x,y) = \left\{ \begin{array}{c} \gamma_{max}(x,y)T_2(L_{in}^{max}) + \\ [1-\gamma_{max}(x,y)][\alpha T_2'(L_{in}^{max})L_{in}^{max}] \end{array} \right\}_\varepsilon^1, \quad \text{Eq. (4)}$$

$$L_{T_2}(x,y) = T_2[L_{in}(x,y)], \quad \text{Eq. (5)}$$

$$L_{lce}^{T_2}(x,y) = \alpha T_2'[L_{in}(x,y)]L_{in}(x,y), \quad \text{Eq. (6)}$$

$$T_2'[L_{in}(x,y)] = \quad \text{Eq. (7)}$$
$$\frac{1}{2}\left\{ \begin{array}{c} [(1-\varphi)z+\varphi][L_{in}(x,y)+\varepsilon]^{[(1-\varphi)z+\varphi-1]} + \\ (2-z)L_{in}^{(1-z)}(x,y) + \\ S(1-z)L_{in}^{\varphi}(x,y)[(\varphi+1)(1-L_{in}(x,y))-L_{in}(x,y)] \end{array} \right\},$$

wherein $\alpha$ is the third parameter with the value −1 or 1, $\{x\}_a^b$ is an operator representing that the value of x is bounded to the range $a \le x \le b$, $L_{out\_T_2}^{SDRCLCE}(x,y)$ is the output luminance pixel value of the input pixel on the x-th row and the y-th column of the image, $L_{T_2}(x,y)$ is the luminance remapping output value of the input pixel on the x-th row and the y-th column of the image, $L_{lce}^{T_2}(x,y)$ is the local contrast enhancement component on the x-th row and the y-th column of the image, $f_n^T(x,y)$ is the normalization factor on the x-th row and the y-th column of the image, and $\gamma(x,y)$ is the weighting coefficient of the input pixel on the x-th row and the y-th column of the image and is defined as Eq.(8):

$$\gamma(x,y) = \frac{\overline{L}_{in}(x,y) + \varepsilon}{L_{in}(x,y) + \varepsilon}, \quad \text{Eq. (8)}$$

wherein $\overline{L}_{in}(x,y)$ is the filter result of the input pixel on the x-th row and the y-th column of the image, $\varepsilon$ is the positive value, $L_{in}^{max}$ is the maximum input luminance pixel value, and $\gamma_{max}(x,y)$ is the maximum weighting coefficient corresponding to the maximum input luminance pixel on the x-th row and the y-th column of the image.

16. The image processing device in claim 14, wherein the pixel value adjustment circuit is further configured to generate Eq.(9) according to Eq.(3)-Eq.(8):

$$L_{out\_T_2}^{SDRCLCE} = \left\{ [g_4(\overline{L}_{in},z)]^{-1} \left\{ \begin{array}{c} g_3(L_{in},\overline{L}_{in})g_1(L_{in},z) + \\ [1-g_3(L_{in},\overline{L}_{in})]g_2(L_{in},z) \end{array} \right\} \right\}_0^1, \quad \text{Eq. (9)}$$

$$\equiv g(L_{in},\overline{L}_{in},z)$$

wherein $g_1(L_{in},z)$ is a function for computing the luminance remapping output value of the input pixels of the image, $g_2(L_{in},z)$ is a function for computing the local contrast enhancement component of the input pixels of the image, $g_3(L_{in},\overline{L}_{in})$ is a function for computing the weighting coefficient of the input pixels of the image, $g_4(\overline{L}_{in},z)$ is a function for computing the normalization factor.

17. The image processing device in claim 16, wherein the pixel value adjustment circuit comprises:
 a three-dimensional luminance lookup table (3D LLUT), wherein the 3D LLUT is constructed according to Eq.(9), wherein input indices of the 3D LLUT are the image-related parameter, the input luminance pixel value of the first input pixel, and the filter result of the first input pixel, and wherein an output of the 3D LLUT is the output luminance pixel value of the first input pixel.

18. The image processing device in claim 16, wherein the pixel value adjustment circuit comprises:
 a two-dimensional luminance lookup table (2D LLUT), wherein the 2D LLUT is constructed and updated according to Eq.(9) and the image-related parameter, wherein input indices of the 2D LLUT are the input luminance pixel value of the first input pixel and the filter result of the first input pixel, and wherein an output of the 2D LLUT is the output luminance pixel value of the first input pixel.

19. The image processing device in claim 16, wherein the pixel value adjustment circuit is configured to generate Eq.(10) according to Eq.(9):

$$\hat{L}_{out\_T_2}^{SDRCLCE} = \quad \text{Eq. (10)}$$
$$\left\{ \begin{array}{ll} g_i(L_{in},\overline{L}_{in}), & \text{if } w=0 \\ (1-w)\times g_i(L_{in},\overline{L}_{in}) + w\times g_{i+1}(L_{in},\overline{L}_{in}), & \text{otherwise} \end{array} \right.,$$

wherein $g_i(L_{in},\overline{L}_{in})=g(L_{in},\overline{L}_{in},i/N-1)$, N is a finite integer satisfying $N \ge 2$, i is an integer satisfying $0 \le i \le N-1$, and $w=z(N-1)-i$.

20. The image processing device in claim 19, wherein the pixel value adjustment circuit comprises:
 N two-dimensional luminance lookup tables, wherein the N two-dimensional luminance lookup tables are constructed according to $g_i(L_{in},\overline{L}_{in})=g(L_{in},\overline{L}_{in},i/N-1)$, wherein N is the finite integer satisfying $N \ge 2$, and i is the integer satisfying $0 \le i \le N-1$, wherein input indices of the N two-dimensional luminance lookup tables are the input luminance pixel value of the first input pixel and the filter result of the first input pixel, and wherein an output of the N-two-dimensional luminance lookup tables is the output luminance pixel value of the first input pixel.

\* \* \* \* \*